(12) United States Patent
Zhang

(10) Patent No.: US 10,484,577 B1
(45) Date of Patent: Nov. 19, 2019

(54) REAL-TIME INTERLEAVED MULTI-SCAN-OUT

(71) Applicant: Facebook Technologies, LLC, Menlo Park, CA (US)

(72) Inventor: Rui Zhang, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 12 days.

(21) Appl. No.: 15/677,972

(22) Filed: Aug. 15, 2017

(51) Int. Cl.
H04N 3/14 (2006.01)
G02B 27/01 (2006.01)
G09G 3/22 (2006.01)

(52) U.S. Cl.
CPC ....... H04N 3/1562 (2013.01); G02B 27/0172 (2013.01); G09G 3/22 (2013.01)

(58) Field of Classification Search
CPC ..... H04N 3/1562; G02B 27/0172; G09G 3/22
See application file for complete search history.

(56) References Cited

U.S. PATENT DOCUMENTS

| | | | | |
|---|---|---|---|---|
| 9,837,010 | B2 * | 12/2017 | Park | G09G 3/20 |
| 9,881,575 | B2 * | 1/2018 | Choi | G09G 3/3666 |
| 10,120,187 | B2 * | 11/2018 | Wittenbrink | G06F 9/451 |
| 2005/0110723 | A1 * | 5/2005 | Shin | G09G 3/3233 345/76 |
| 2005/0190119 | A1 * | 9/2005 | Yamazaki | G09G 3/20 345/59 |
| 2010/0079356 | A1 * | 4/2010 | Hoellwarth | G02B 27/017 345/8 |
| 2013/0307758 | A1 * | 11/2013 | Kim | G09G 3/22 345/55 |
| 2016/0019824 | A1 * | 1/2016 | Choi | G09G 3/3666 345/694 |
| 2016/0063919 | A1 * | 3/2016 | Ha | G02B 27/017 345/156 |
| 2016/0093262 | A1 * | 3/2016 | Choi | G09G 3/003 345/204 |
| 2016/0118023 | A1 * | 4/2016 | Park | G09G 3/20 345/204 |
| 2018/0158398 | A1 * | 6/2018 | Xiang | G09G 3/3233 |
| 2018/0219025 | A1 * | 8/2018 | Takahashi | G09G 3/3611 |
| 2019/0005884 | A1 * | 1/2019 | Yoo | G02B 27/0172 |

* cited by examiner

*Primary Examiner* — Peter D McLoone
(74) *Attorney, Agent, or Firm* — Kilpatrick Townsend & Stockton LLP

(57) ABSTRACT

Disclosed herein are techniques for single-panel image display. A display device comprises a two-dimensional pixel array and a control circuit. The two-dimensional pixel array comprises a first region and a second region, each region including two or more lines of pixels. The control circuit is configured to select a first set of one or more lines of pixels in the first region to receive image data for an image frame, and, before selecting a second set of one or more lines of pixels in the first region to receive image data for the same image frame, select a first set of one or more lines of pixels in the second region to receive image data for the same image frame.

20 Claims, 14 Drawing Sheets

REAL-TIME INTERLEAVED MULTI-SCAN-OUT

BACKGROUND

The present disclosure generally relates to head-mounted display (HMD) devices, and more specifically relates to HMD devices with a single display panel for both eyes of a user.

In some singe-panel video image display devices, such as some HMD devices for virtual reality (VR), augment reality (AR), or mixed reality (MR) display, the single display panel may include a left region and a right region. The left region may be used to display image contents to the left eye of a user of the device. The right region may be used to display image contents to the right eye of the user. Because the corresponding image contents of an image frame are generally displayed by sequential scanning of lines of pixels in the single display panel, the left region and the right region of the single panel may not display the corresponding image contents of the same image frame at each time instants. For the comfort of use of the device over an extended period of time, it is generally desirable to minimize a delay between the image contents of an image frame displayed to the left eye and the corresponding image contents of the same image frame displayed to the right eye.

SUMMARY

This invention generally relates to video image display. More specifically, techniques disclosed herein use an interleaved image frame scan scheme in video image display devices (e.g., VR display devices) having a single display panel to reduce a delay between the image contents of a video image frame displayed to the left eye and the corresponding image contents of the same video image frame displayed to the right eye, as the delay might cause user uncomfortableness and/or fatigue over time. In some implementations, rather than sequentially scanning each line of pixels of the single display panel, lines of pixels in the left region and the right region of the single display panel may be scanned alternately. In one specific example, the single display panel may include 2N lines of pixels, where the first N lines of pixels may be used to display image contents to the left eye of a user, and lines N+1 to 2N may be used to display image contents to the right eye of the user. Rather than scanning the 2N lines of pixels sequentially from 1 to 2N, the 2N lines of pixels of the single display panel may be scanned in different order, such as lines 1, N+1, 2, N+2, 3, N+3, . . . , N−1, 2N−1, N, and 2N. In this way, a delay between the image contents of an image frame displayed to the left eye and the corresponding image contents of the same image frame displayed to the right eye may be minimized to, for example, the time for scanning a single line of pixels.

In some embodiments, a display device may include a two-dimensional pixel array and a control circuit. The two-dimensional pixel array may include a first region and a second region, each region including two or more lines of pixels. The control circuit may be configured to select a first set of one or more lines of pixels in the first region to receive image data for an image frame, and then select a first set of one or more lines of pixels in the second region to receive image data for the same image frame before selecting a second set of one or more lines of pixels in the first region to receive image data for the same image frame.

In certain embodiments, a control circuit for a two-dimensional pixel array may include a first group of gates and a second group of gates, where the two-dimensional pixel array may include a first region (e.g., left region) and a second region (e.g., right region). Each of the first and second regions may include two or more lines of pixels. The control circuit may be configured to select, using the first group of gates, a first set of one or more lines of pixels in the first region to receive image data for an image frame, and then select, using the second group of gates, a first set of one or more lines of pixels in the second region to receive image data for the same image frame, before selecting a second set of one or more lines of pixels in the first region using the first group of gates to receive image data for the same image frame.

In certain embodiments, a method for single-panel image display may include selecting, from a two-dimensional pixel array that comprises a first region and a second region each comprising two or more lines of pixels, a first set of one or more lines of pixels in the first region to receive image data for an image frame; and then selecting a first set of one or more lines of pixels in the second region to receive image data for the same image frame, before selecting a second set of one or more lines of pixels in the first region to receive image data for the same image frame.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1:
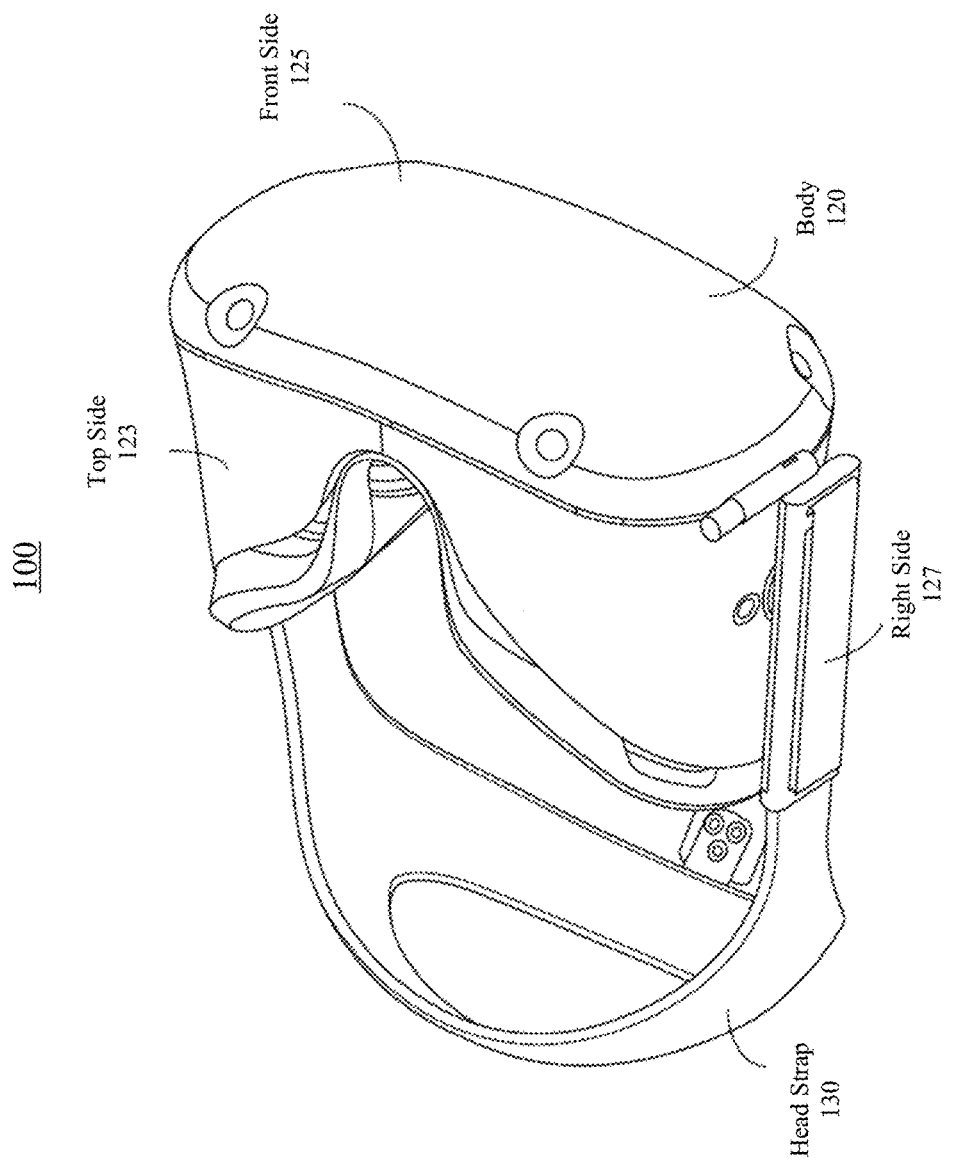
FIG. 1 is a perspective view of a head-mounted display (HMD) device, according to certain embodiments.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

In many video image display devices, a single display panel, rather than two separate display panels each for one eye of a user, may be used for various reasons. For example, a single display panel may have a lower cost and/or may provide a better image viewing experience for virtual reality (VR), augment reality (AR), or mixed reality (MR) image contents. In some single-panel display devices, multiple data lines may be driven in parallel by corresponding image data. Pixels coupled to each data line may be sequentially selected to electrically connect a pixel to the data line at a time such that the pixel may be driven by the image data present on the data line. Pixels that may be selected at the same time from the pixels coupled to the multiple data lines by the same control signals may be referred to as pixels on (or coupled to) a scan line. Thus, in implementations where all data lines are driven in parallel, the time to scan an image frame may be about the same as the time to sequentially select all pixels coupled to a data line or the time to sequentially select all scan lines.

In some implementations, to display a video image frame, a first half of the pixels coupled to a data line may be sequentially selected to display image contents to the left eye on the left region (also referred to as the left viewing area) of the display panel. Subsequently, the second half of the pixels coupled to the data line may be sequentially selected to display corresponding image contents for the image frame to the right eye on the right region (also referred to as the right viewing area) of the display panel. Thus, for each image frame, the image contents for the right eye may be displayed at a time that is a half frame period after the corresponding image contents for the left eye is displayed. For example, at a certain time, the left eye of the user may be viewing image contents for image frame n displayed on the left region, while the right eye of the user may be viewing image contents for frame n–1 displayed on the right region. Such a delay between the image contents displayed on the left region and the right region may be fairly large when the frame rate is low, such as at or below 72 Hz. This large delay may cause user uncomfortableness and/or fatigue over time.

According to certain aspects of the present disclosure, an interleaved image frame scan scheme may be used in video image display devices (e.g., VR display devices) having a single display panel to reduce a delay between the image contents displayed to the left eye and the corresponding image contents in the same image frame displayed to the right eye. In some implementations, instead of sequentially scanning each line of pixels of the single display panel, lines of pixels in the left and right regions of the single display panel may be scanned alternately. For example, a control circuit may be used to select a first set of one or more lines of pixels in the left region to receive image data for an image frame, and then select a first set of one or more lines of pixels in the right region to receive image data for the same image frame, before selecting a second set of one or more lines of pixels in the left region to receive image data for the same image frame.

FIG. 1 is a perspective view of an example HMD device 100, according to certain embodiments. HMD device 100 may be a part of, e.g., a virtual reality (VR) system, an augmented reality (AR) system, a mixed reality (MR) system, or some combinations thereof. HMD device 100 may include a body 120 and a head strap 130. FIG. 1 shows a top side 123, a front side 125, and a right side 127 of body 120 in the perspective view. Head strap 130 may have an adjustable or extendible length. There may be a sufficient space between body 120 and head strap 130 of HMD device 100 for allowing a user to mount HMD device 100 onto the user's head. In various embodiments, HMD device 100 may include additional, fewer, or different components. For example, in some embodiments, HMD device 100 may include eyeglasses temples and temples tips, rather than head strap 130.

HMD device 100 may present to a user media including virtual and/or augmented views of a physical, real-world environment with computer-generated elements. Examples of the media presented by HMD device 100 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 1) enclosed in body 120 of HMD device 100. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 100 may include two eye box regions.

In some implementations, HMD device 100 may include various sensors (not shown), such as motion sensors, position sensors, and eye tracking sensor. In some implementations, HMD device 100 may include an input/output interface for communicating with a console. In some implementations, HMD device 100 may include a virtual reality engine (not shown) that can execute applications within HMD device 100 and receive position information, acceleration information, velocity information, predicted future positions, or some combination thereof of HMD device 100 from the various sensors. In some implementations, the information received by the virtual reality engine may be used for producing a signal (e.g., display instructions) to the one or more display assemblies.

Figure 2:
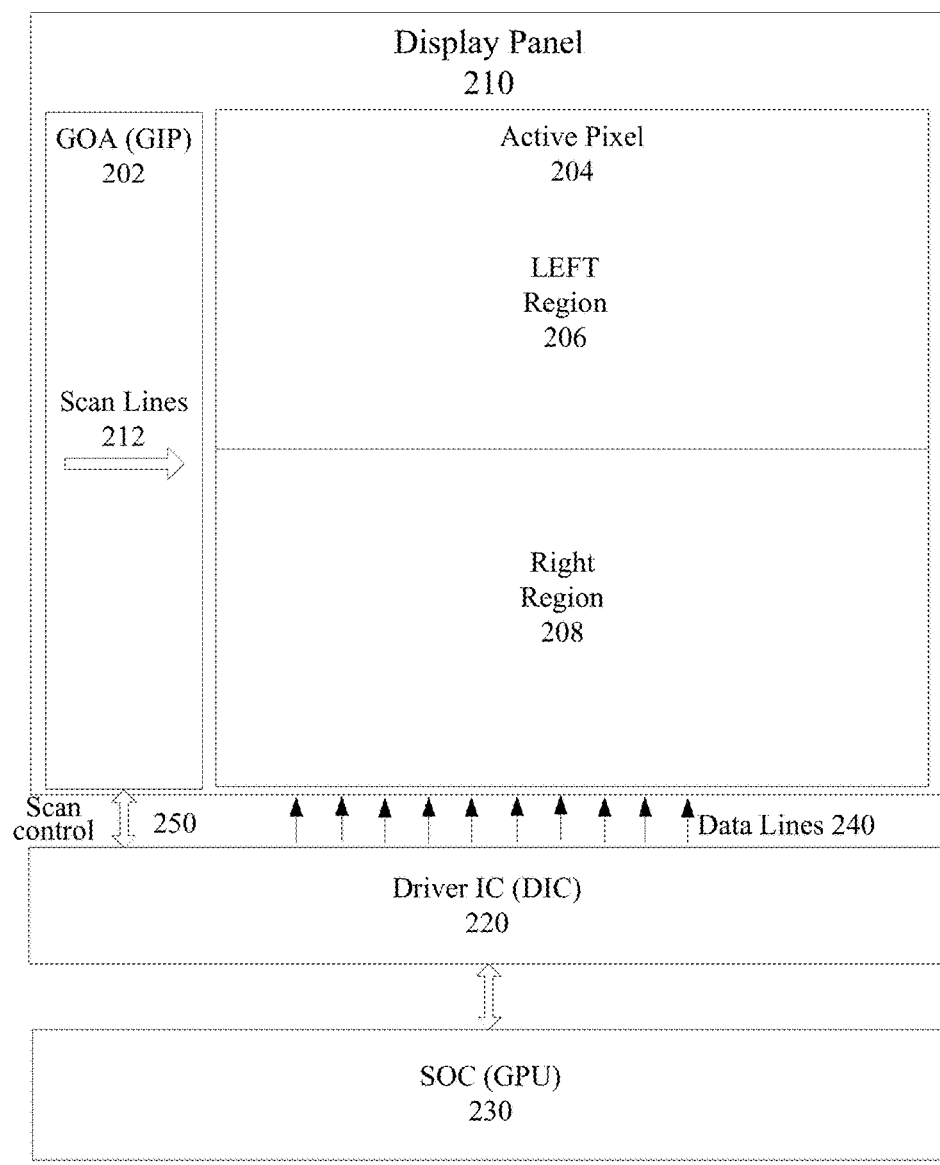
FIG. 2 is a simplified block diagram illustrating an example display module with a single display panel, according to certain embodiments.

FIG. 2 is a simplified block diagram illustrating an example display module 200 including a single display panel 210, according to certain embodiments. Display panel 210 may be any electronic display panel as describe above. Display panel 210 may include active pixels 204 that are arranged as a two-dimensional pixel array. The two-dimensional pixel array may be coupled to a plurality of scan lines 212 and a plurality of data lines 240 directly or indirectly. Each scan line 212 may be coupled to pixels on a row (or line) of the two-dimensional pixel array shown in FIG. 2, and may be used to connect the pixels on a row of the two-dimensional pixel array to corresponding data lines 240. Each data line 240 may be coupled to pixels on a column of the two-dimensional pixel array shown in FIG. 2 through switches, and may be used to send image data to the pixels on (i.e., coupled to) a scan line 212 that has been selected or activated (e.g., driven by a "high" signal). In general, the plurality of scan lines may be selected or activated one at a time to connect the pixels coupled to the scan line to corresponding data lines. The plurality of data lines 240 may be driven in parallel to send data to a row of pixels connected to a selected or activated scan line at the same time. The two-dimensional pixel array may be characterized by a left region 206 and a right region 208. Left region 206 may include a first groups of scan lines and may be used for displaying image contents to the left eye of a user. Right region 208 may include a second groups of scan lines and may be used for displaying corresponding image contents to the right eye of the user. It is noted that, in some implementations, the image data for the left region (eye) and the image data for the right region (eye) may be different, even though they are for the same image frame. For example, the single display panel may be used to display stereoscopic images, where the left region may show a slightly different image than the right region for a same image frame.

Display panel 210 may also include on-panel peripheral circuits, such as gates in panel (GIP) or gates of array (GOA) 202. GOA 202 may include a plurality of gates (also referred to as gate driver) that can be used to drive different scan lines for selecting pixels on the scan lines to receive image data for displaying. GOA 202 may be connected to scan control bus 250, which may send scan control signal(s) to selectively activate (scan) the plurality of scan lines for displaying image contents.

Data lines 240 and scan control bus 250 may be driven by a driver IC (DIC) 220. DIC 220 may receive image data from a circuit, such as a system on chip (SOC) 230 that may include one or more graphic processing units (GPUs), and send the received image data to active pixels 204 through data lines 240. In some implementations, DIC 220 may not include a buffer. In some implementations, DIC 220 may include a buffer, and thus may temporarily store the received image data and process (e.g., scramble) the image data before sending the image data to data lines 240. For example, in some implementations, instead of sending image data for frame n to left region 206 and right region 208 in an image frame, DIC 220 may send image data for frame n to left region 206 and send image data for frame n+1 to right region 208 in an image frame. DIC 220 may also generate scan control signals, such as clocks and trigger signals, and send the scan control signals to GOA 202 through scan control bus 250.

SOC 230 may receive information such as position information, acceleration information, velocity information, predicted future positions, or some combination thereof from the various sensors, and execute graphic processing applications to produce image frames using the received information. SOC 230 may include one or more graphic processing units (GPUs) for parallel image data processing.

Figure 3:
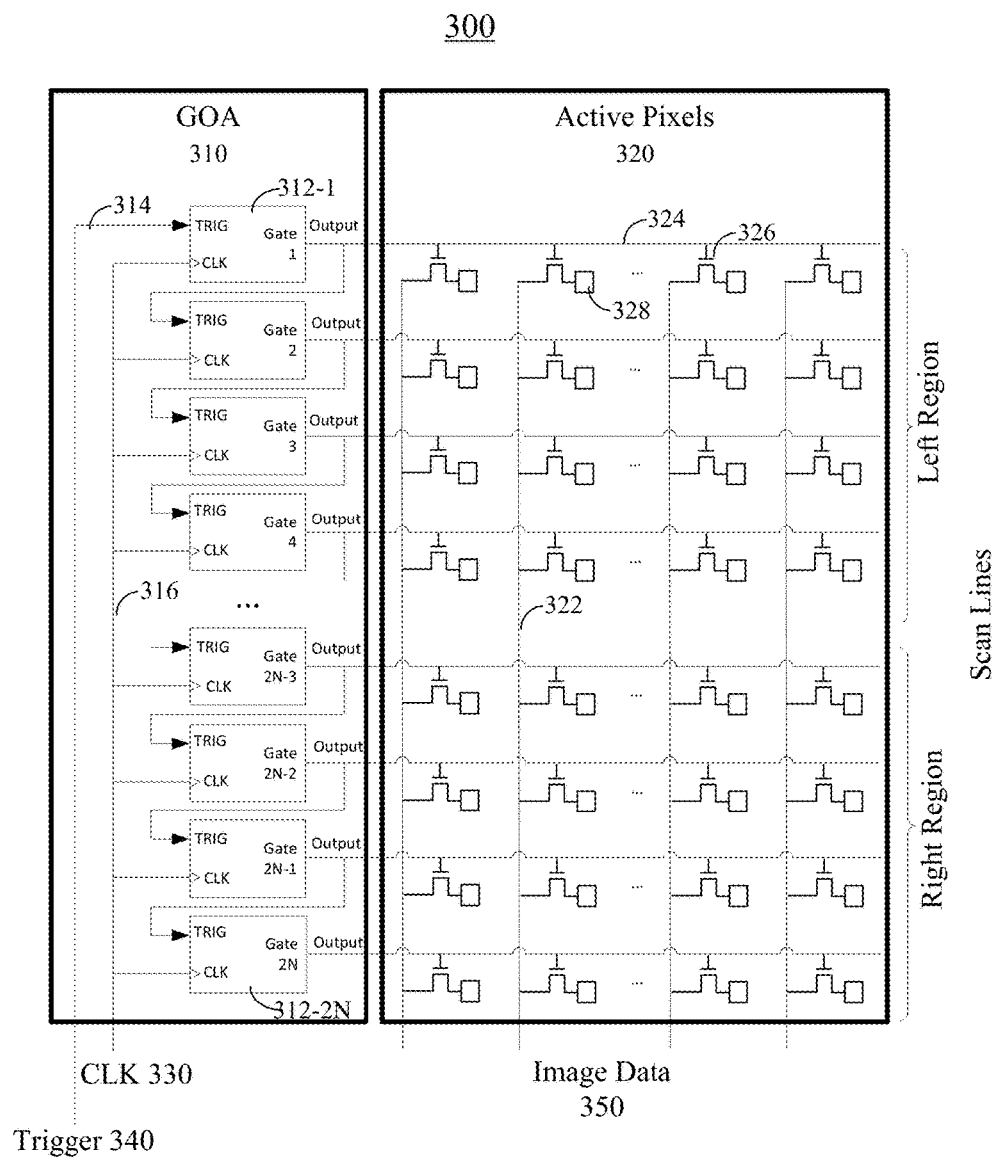
FIG. 3 is a simplified block diagram illustrating an example display panel in a display module.

FIG. 3 is a simplified block diagram illustrating an example display panel 300 in a display module. Display panel 300 may be a specific implementation of display panel 210. Display panel 300 may include a GOA 310 and active pixels 320. As described above with respect to display panel 210 of FIG. 2, active pixels 320 may be arranged into a two-dimensional pixel array. Each active pixel 320 may include a switching circuit (e.g., a transistor 326, such as a p or n-type MOSFET) and a display cell 328 (e.g., LCD or LED cell as described above). The two-dimensional pixel array may be coupled to a plurality of scan lines 324 and a plurality of data lines 322 directly or indirectly. Each scan line 324 may be coupled to pixels on a row (i.e., line) of the two-dimensional pixel array, and may be used to select a line of pixels by connecting the display cells of the pixels on the row of the two-dimensional pixel array to corresponding data lines 322 through, for example, transistors 326. A scan line may be selected (or active) when, for example, a signal at a level higher than a threshold level is sent to the scan line to turn on transistors 326 that are connected to the scan line, such that the pixels on the corresponding row of the two-dimensional pixel array may be connected to respective data lines 322 to receive image data. Each data line 322 may be coupled to pixels on a column of the two-dimensional pixel array, and may be used to send image data to the display cells of the pixels coupled to a selected (i.e., active) scan line 324.

GOA 310 may include an array of gates (i.e., gate drivers) 312-1, 312-2, . . . 312-2N−1, and 312-2N (collectively referred to as gates 312). Each gate 312-1, 312-2, . . . 312-2N−1, or 312-2N may include, for example, a flip-flop, a latch, a memory cell, a zero-order hold, or a delay line, such as a D flip-flop or a gated latch. In some implementations, each gate may include a clock input, a trigger input, and an output. The clock input may be, for example, edge triggered or level triggered. Thus, the output of the gate may be determined by the input level at the trigger input when the signal applied to the clock input is at a high or low level, or at a rising or falling edge (referred to as an active period). For example, if the input level at the trigger input is at a "high" level (e.g., above a threshold level), the output of the gate may be high, and thus the scan line connected to the output of the gate may be driven by the high level signal (i.e., selected or active). The high level signal on the scan line may turn on transistors 326 that are connected to the scan line so that the display cells of the pixels coupled to the scan line can receive image data 350 from data lines 322. If the input level at the trigger input is at a "low" level (e.g., below a threshold level), the output of the gate may be low, and thus the scan line connected to the output of the gate may be driven by the low level signal (i.e., unselected or inactive). Transistors 326 connected to the scan line may not be turned on by the low level signal, and thus the display cells of the pixels coupled to the scan line may not receive image data 350 on data lines 322.

As shown in FIG. 3, gates 312 may be connected to a clock bus 316 and a trigger signal bus 314. Clock bus 316 may be driven by a clock signal 330, and trigger signal bus 314 may be driven by a trigger signal 340. Clock signal 330 and trigger signal 340 may be from DIC 220 described above with respect to FIG. 2. Clock bus 316 may be connected to each gate of gates 312. Trigger signal bus 314 may be connected to the first gate 312-1 in gates 312. The output of gate 312-1 may be used as the input to the trigger input of the next gate 312-2 in gates 312, the output of gate 312-2 may be used as the input to the trigger input of the next gate 312-3 in gates 312, and so on. In this way, a pulse on trigger signal bus 314 may cause the output of gate 312-1 to go high and select the first scan line in the first clock cycle. In the next clock cycle, the high level signal at the output of gate 312-1 that is coupled to the trigger input of gate 312-2 may cause the output of gate 312-2 to go high and select the second scan line. At the same time, a low level on trigger signal bus 314 may cause the output of gate 312-1 to go low and deselect the first scan line. In this way, in each clock cycle, one scan line may be selected, and thus pixels connected to the scan line may receive image data from data lines 322 for displaying image contents. Therefore, the 2N rows (2N scan lines) of the two-dimensional pixel array may be selected sequentially from the left region to the right region in 2N clock cycles to scan an image frame.

Figure 4:
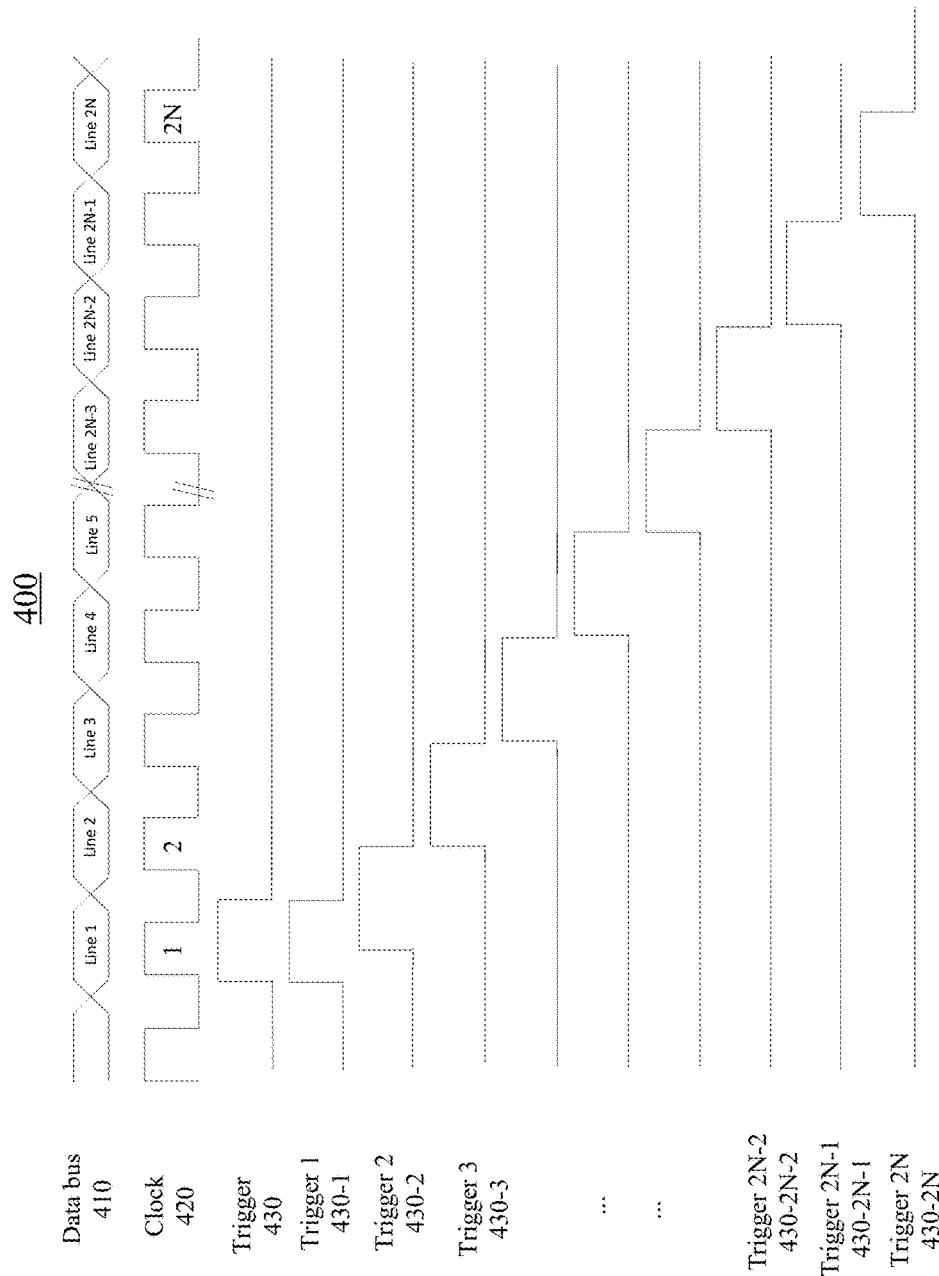
FIG. 4 is an example timing diagram illustrating example data and control signals for displaying an image frame using the display panel shown in FIG. 3.

FIG. 4 is an example timing diagram 400 illustrating example data and control signals for displaying an image frame using display panel 300 shown in FIG. 3. Timing diagram 400 shows image data on data bus 410 and control signals for GOA 310, including a clock signal 420 and a trigger signal 430. As described above, the image data and the control signals may be sent to the display panel from a driver IC, such as DIC 220. Trigger signal 430 may be connected to the trigger input of the first gate, gate 1 (312-1) shown in FIG. 3. Thus, trigger input Trigger 1 (430-1) for gate 1 (312-1) is substantially the same as trigger signal 430. The output from gate 1 may be sent to the trigger input of gate 2 (312-2) as Trigger 2 (430-2), the output from gate 2 may be sent to the trigger input of gate 3 (312-3) as Trigger 3 (430-3), . . . , and the output from gate 2N−1 may be sent to the trigger input of gate 2N (312-2N) as Trigger 2N (430-2N).

At the first clock cycle (Clock 1), image data for pixels connected to scan line 1 may be sent to the data lines. A positive pulse on trigger signal 430 may be sent to trigger signal bus 314 such that, when clock signal 420 is in an active period, for example, at an edge (rising or falling) or at a high or low level, trigger signal 430 is high. As a result, a high level output may be generated by gate 1 (312-1) and sent to scan line 1 to turn on the switches of pixels connected to scan line 1, so that the display cells of pixels connected to scan line 1 may receive image data present on the data lines. The high level output from gate 1 may also be sent to the trigger input of gate 2 (312-2).

At the second clock cycle (Clock 2), when clock signal 420 is in the active period, trigger signal 430 is low and the signal level at the trigger input of gate 2 is high. Thus, the output of gate 1 may toggle to a low level, and the output of gate 2 may toggle to a high level. As such, scan line 1 driven by the output of gate 1 is deselected to disconnect the display cells of pixels coupled to scan line 1 from the data lines, and scan line 2 driven by the output of gate 2 is selected to connect display cells of pixels coupled to scan line 2 to the data lines. Therefore, image data present on the data lines (image data for line 2) may be received by the display cells of pixels connected to scan line 2 from the data lines.

At each consecutive clock cycle, a new scan line may be selected to connect the display cells of pixels connected to the scan line to the data lines for receiving image data for pixels on the scan line from the data lines. After Clock 2N, image data for an image frame may have been sent to the corresponding pixels for displaying the image contents.

It is noted that in some implementations, the scan lines may be selected differently. For example, transistors 326 (e.g., p-channel MOSFET) may be turned on by a low level signal on the scan line. Thus, the scan line may be selected by a low level signal. In some implementations, the output of the gate may be the inverse of the trigger input in the active period of the clock signal. Thus, trigger signal 430 may have a waveform different from the waveform shown in FIG. 4. A person skilled in the art would understand that there are many ways to select one scan line at a time.

Figure 5:
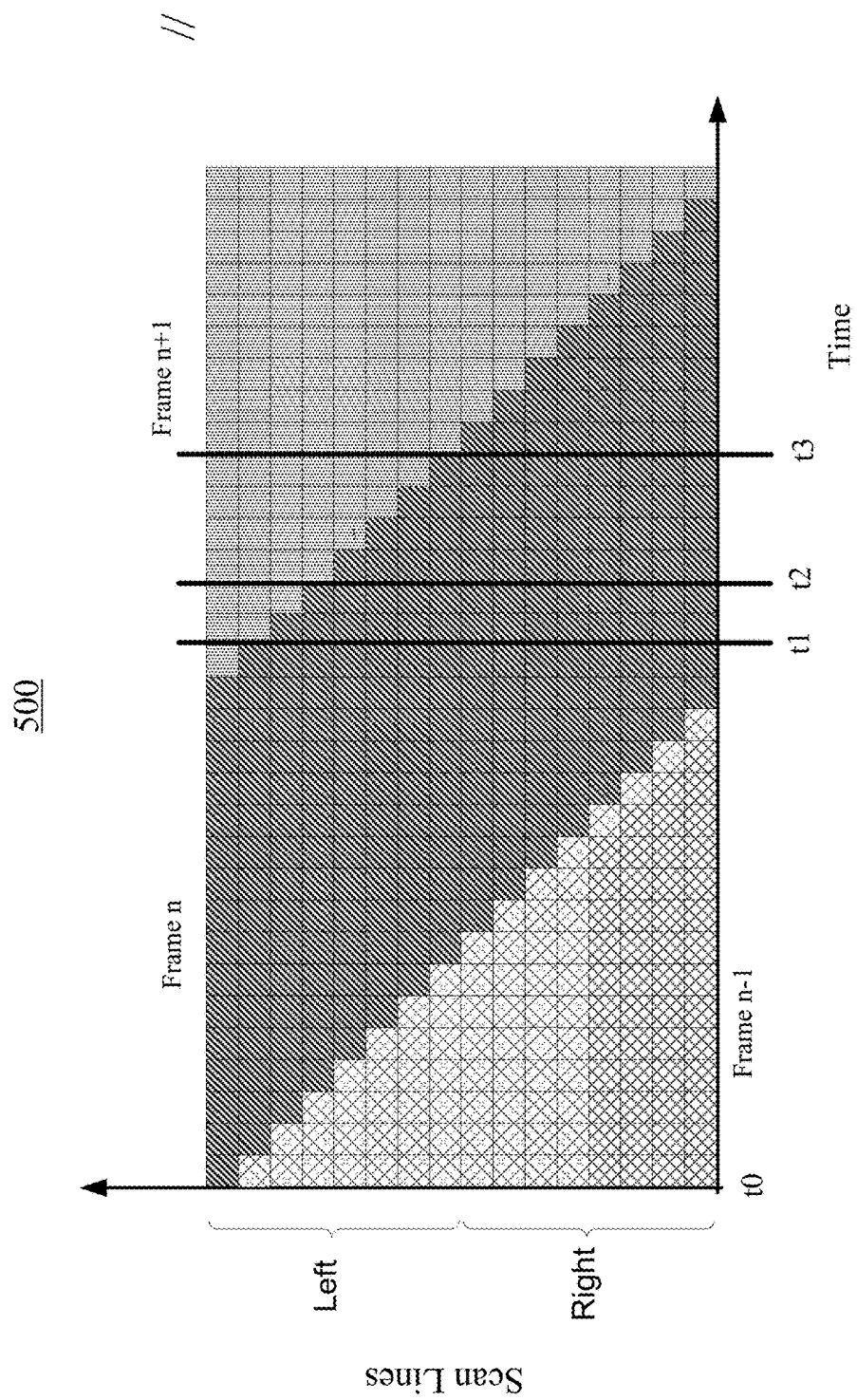
FIG. 5 is an example chart illustrating sequential scanning of lines of pixels of a single-panel display for consecutive image frames.

FIG. 5 is an example chart 500 illustrating sequential scanning of lines of pixels of a single-panel display for consecutive image frames. The x-axis of chart 500 represents the time instants (e.g., clock cycles) during the image frame scanning, and the y-axis of chart 500 represents the image content displayed by pixels connected to each scan line of the single-panel display that includes a left region and a right region. At time t0, pixels connected to each scan line of the single-panel display may display image contents for image frame n−1. In each of subsequent 2N clock cycles, pixels connected to one scan line may be selected to receive image data for image frame n. After 2N clock cycles, pixels connected to each scan line of the single-panel display may have received image data for image frame n, and the single-panel display may display image contents for image frame n to both eyes of a user. In each of the next 2N clock cycles, pixels connected to one scan line may be selected to receive image data for image frame n+1. After 2N clock cycles, pixels connected to each scan line of the single-panel display may have received the image data for image frame n+1, and the single-panel display may display image contents for image frame n+1 to both eyes of the user.

Figure 6:
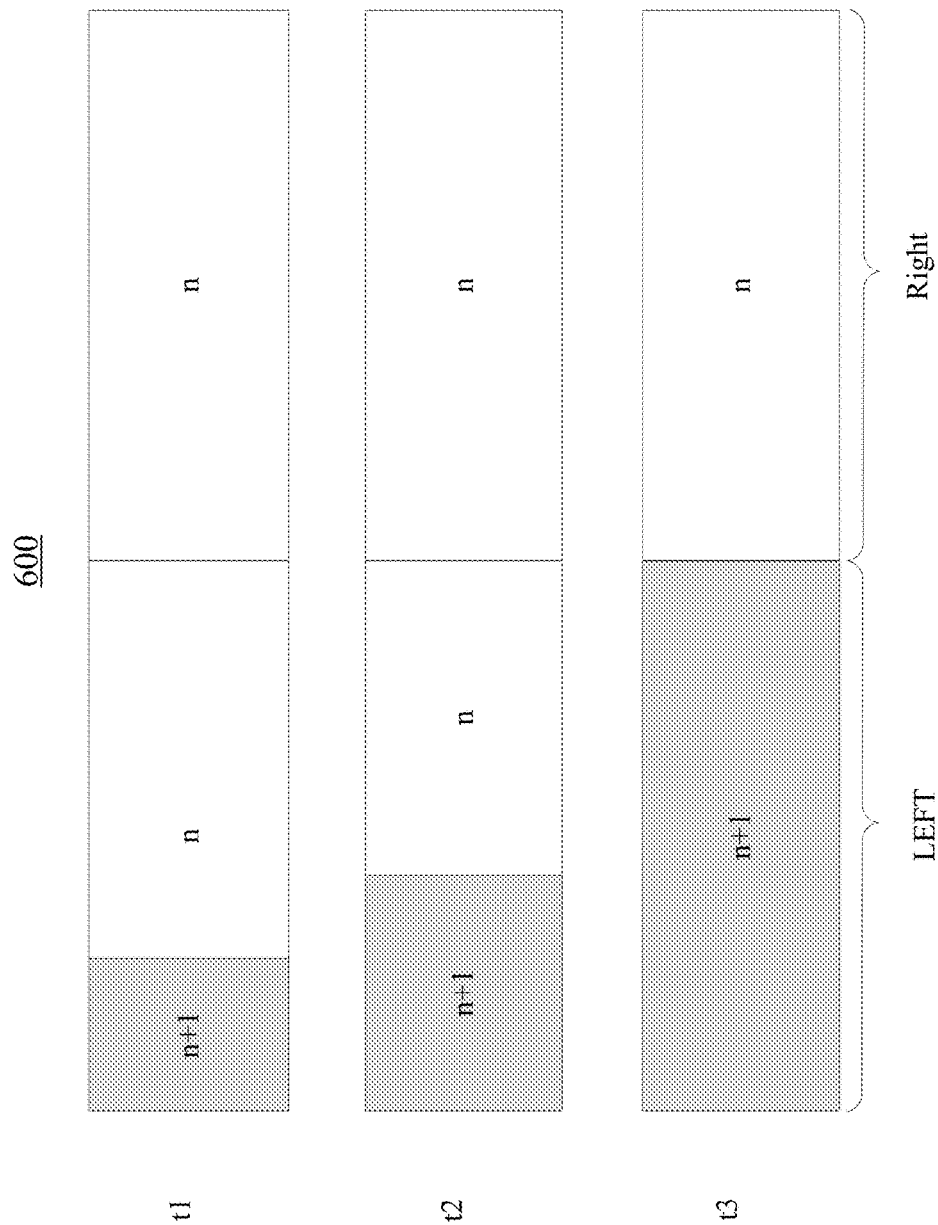
FIG. 6 illustrates example displayed contents at different time instants during the scanning of lines of pixels in a single-panel display.

FIG. 6 illustrates example displayed contents at different time instants shown in FIG. 5 during the scanning of lines of pixels in a single-panel display. After time t1, a portion of pixels in the left region may have received image data for image frame n+1, while other portions of the pixels in the left region and all pixels in the right region may still display image contents for image frame n. After time t2, more portions of the pixels in the left region may have received image data for image frame n+1, while other portions of the pixels in the left region and all pixels in the right region may still display image contents for image frame n. After time t3, substantially all portions of the pixels in the left region may have received image data for image frame n+1, while all pixels in the right region may still display image contents for image frame n. Thus, there is a delay of approximately a half frame period (i.e., N clock cycles) between the time when certain image contents of an image frame is displayed on the left region of the single-panel display and the time when corresponding image contents is displayed on the right region of the single-panel display. As such, at a given time, the left eye of the user may be viewing image contents for image frame n on the left region, while the right eye of the user may be viewing image contents for image frame n−1 on the right region. Such a delay between the display of corresponding image contents on the left region and the right region may be fairly large when the frame rate is low, such as at or below 72 Hz. This large delay may cause user uncomfortableness and/or fatigue over time.

According to certain aspects of the present disclosure, an interleaved image frame scan scheme may be used in video image display devices (e.g., VR display devices) having a single display panel to reduce a delay between the display of image contents of an image frame to the left eye of a user and the display of the corresponding image contents of the image frame to the right eye of the user. In some implementations, rather than sequentially scanning each line of pixels of the single display panel, lines of pixels in the left region and the right region of the single display panel may be scanned alternately. For example, a control circuit may be used to select a first set of one or more lines of pixels in the left region to receive image data for an image frame, and then select a first set of one or more lines of pixels in the right region to receive corresponding image data for the same image frame, before selecting a second set of one or more lines of pixels in the left region to receive image data for the same image frame.

In one implementation, two or more cascaded trigger signal chains and two or more clock signals with a same frequency but different (e.g., opposite) phases may be used to sequentially and alternately select pixels on each data line. For example, a first clock signal and a first cascaded trigger signal chain may be used to sequentially select the pixels (scan lines) on the left region, and a second clock signal and a second cascaded trigger signal chain may be used to sequentially select the pixels (scan lines) on the right region. The first cascaded trigger signal chain may be connected to a first trigger signal, and the second cascaded trigger signal chain may be connected to a second trigger signal. In some implementations, the second trigger signal may be delayed from the first trigger signal. Additionally or alternatively, the second clock signal may be delayed (e.g., by a half cycle time) compared with the first clock signal, such that the active periods of the first clock signal may not overlap with the active periods of the second clock signal. As a result, for each data line, pixels on the left region and pixels on the right region may be alternately selected to connect to the data line and be driven by data on the data line, which may be rearranged accordingly so that image data for the left region may be interleaved with corresponding image data for the right region on the data line.

In one specific example, a video image display device may include, for example, 2N pixels associated with each data line, where pixels 1-N may be on the left region and pixels N+1-2N may be on the right region. During the active period of cycle 1 of the first clock signal, image data for pixel 1 associated with each data line may be present on the data line, and a first trigger signal connected to the gate driver for pixel 1 associated with each data line may be at a high level. Thus, the output of the gate driver for pixel 1 may be at a high level, and the display cell of pixel 1 may be connected to the data line and driven by the data on the data line. During at least a portion of the inactive period of cycle 1 of the first clock signal, the second clock signal may be in an active period of cycle 1 of the second clock signal, image data for pixel N+1 associated with each data line may be present on the data line, and a second trigger signal connected to the gate driver for pixel N+1 associated with each data line may be a high level. Thus, the output of the gate driver for pixel N+1 may be at a high level, and the display cell of pixel N+1 may be connected to the data line and driven by the data on the data line. Next, during the active period of cycle 2 of the first clock signal, pixel 2 associated with each data line may be selected using the first clock signal and the output of the gate driver for pixel 1 (as the trigger signal), and may be driven by image data for pixel 2 associated with each data line (which is on the data line). Subsequently, during the active period of cycle 2 of the second clock signal (during which the first clock signal may be in an inactive period), pixel N+2 associated with each data line may be selected using the second clock signal and the output of the gate driver for pixel N+1 (as the trigger signal), and may be driven by image data for pixel N+2 associated with each data line. In this way, the image contents for the left eye and the corresponding image contents for the right eye may be displayed alternately with a delay of about a half clock cycle time, which is much less than a half frame period.

Figure 7:
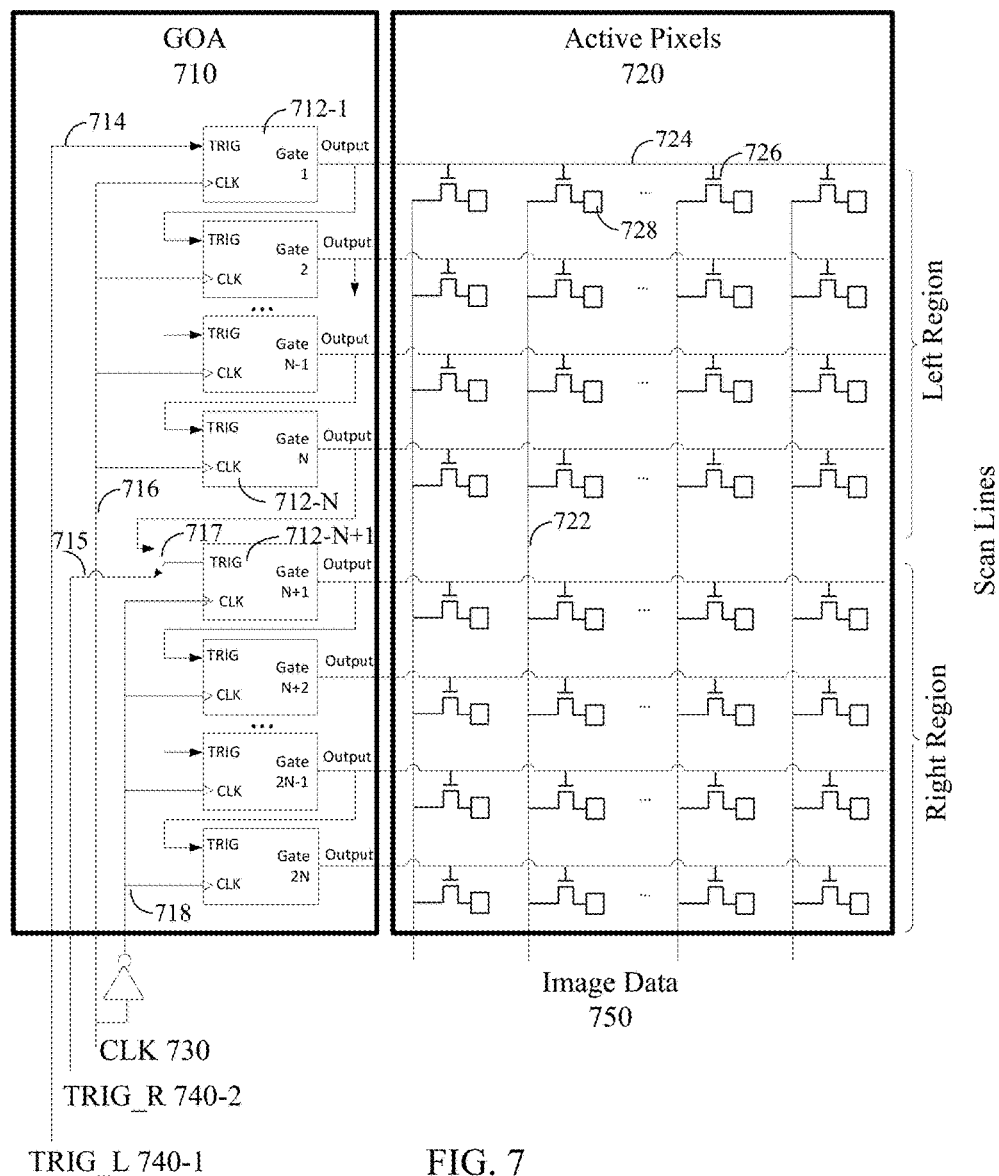
FIG. 7 is simplified block diagram illustrating an example display panel in a display module, according to certain embodiments.

FIG. 7 is a simplified block diagram illustrating an example display panel 700 in a display module such as display module 200, according to certain embodiments. As display panel 300, display panel 700 may include a GOA 710 and active pixels 720. Active pixels 720 may form a two-dimensional pixel array. Each active pixel 720 may include a switching circuit (e.g., a transistor 726, such as a n-channel or p-channel MOSFET) and a display cell 728 (e.g., an LCD or LED display cell as described above). The two-dimensional pixel array may be coupled to a plurality of (e.g., 2N) scan lines 724 and a plurality of data lines 722 directly or indirectly, where scan lines 1-N may be used for the left region of the display panel (for displaying image contents to the left eye) and scan lines N+1 to 2N may be used for the right region of the display panel (for displaying image contents to the right eye). Each scan line 724 may be coupled to pixels on a row (i.e., line) of the two-dimensional pixel array, and may be used to select a line of pixels by connecting the display cells of the pixels on the line of the two-dimensional pixel array to corresponding data lines 722 through, for example, transistors 726. A scan line may be selected (or active) when, for example, a signal higher than a threshold level is sent to the scan line to turn on transistors 726 that are connected to the scan line, such that the pixels on the corresponding row of the two-dimensional pixel array may be connected to respective data lines 722 to receive image data. Each data line 722 may be coupled to pixels on a column of the two-dimensional pixel array, and may be used to send image data to the display cells of the pixels coupled to a selected scan line 724.

GOA 710 may include an array of gates (i.e., gate drivers) 712-1, 712-2, . . . 712-2N–1, and 712-2N (collectively referred to as gates 712). Each gate 712-1, 712-2, . . . 712-2N–1, or 712-2N may include, for example, a flip-flop, a latch, a memory cell, a zero-order hold, or a delay line, such as a D flip-flop or a gated latch. In some implementations, each gate may include a clock input, a trigger input, and an output. The clock input may be, for example, edge triggered or level triggered. Thus, the output of the gate may be determined by the input level at the trigger input when the signal applied to the clock input is in an active period, such as at a (rising or falling) edge or at a high or low level. For example, if the input level at the trigger input is at a "high" level (e.g., above a threshold level), the output of the gate may be high, and thus the scan line connected to the output of the gate may be driven by the high level signal (i.e., selected or active). The high level signal on the scan line may turn on transistors 726 that are connected to the scan line so that the display cells of the pixels coupled to the scan line can receive image data 750 from data lines 722. If the input level at the trigger input is at a "low" level (e.g., below a threshold level), the output of the gate may be low, and thus the scan line connected to the output of the gate may be driven by the low level signal (i.e., unselected or inactive). Transistors 726 connected to the scan line may not be turned on by the low level signal, and thus the display cells of the pixels coupled to the scan line may not receive image data 750 on data lines 722.

As show in FIG. 7, gates 712-1 to 712-N for the left region may be connected to a clock bus 716 and a trigger signal bus 714. Clock bus 716 may be driven by a first clock signal 730. Trigger signal bus 714 may be driven by a trigger signal TRIG_L 740-1. Clock signal 730 and trigger signal TRIG_L 740-1 may be from a driver IC, such as DIC 220 described above with respect to FIG. 2. Clock bus 716 may be connected to each gate of gates 712-1 to 712-N. Trigger signal bus 714 may be connected to the first gate 712-1 in gates 712-1 to 712-N. The output of gate 712-1 may be used as the input to the trigger input of the next gate 712-2 in gates 712-1 to 712-N, the output of gate 712-2 may be used as the input to the trigger input of the next gate 712-3, and so on. Thus, a pulse on trigger signal bus 714 may cause the output of gate 712-1 to go high and select the first scan line in the first clock cycle. In the next clock cycle, the high level signal at the output of gate 712-1 that is coupled to the trigger input of gate 712-2 may cause the output of gate 712-2 to go high and select the second scan line. At the same time, a low level on trigger signal bus 714 may cause the output of gate 712-1 to go low and deselect the first scan line. In this way, in each clock cycle of N clock cycles, one scan line may be selected, and thus pixels connected to the scan line may receive image data from data lines 722 for displaying image contents.

As also shown in FIG. 7, gates 712-N+1 to 712-2N for the right region may be connected to a clock bus 718 and a trigger signal bus 715. Clock bus 718 may be driven by a second clock signal, such as a clock signal derived from clock signal 730 (e.g., after an inverter) or a clock signal independent of clock signal 730. Trigger signal bus 715 may be driven by a trigger signal TRIG_R 740-2. The second clock signal and trigger signal TRIG_L 740-2 may be from a driver IC, such as DIC 220 described above with respect to FIG. 2. Clock bus 718 may be connected to each gate of gates 712-N+1 to 712-2N. Trigger signal bus 715 may be connected to the first gate 712-N+1 in gates 712-N+1 to 712-2N. The output of gate 712-N+1 may be used as the input to the trigger input of the next gate 712-N+2 in gates 712-N+1 to 712-2N, the output of gate 712-N+2 may be used as the input to the trigger input of the next gate 712-N+3, and so on. Thus, a pulse on trigger signal bus 715 may cause the output of gate 712-N+1 to go high and select the (N+1)th scan line in the first clock cycle of the second clock signal. In the next clock cycle of the second clock signal, the high level signal at the output of gate 712-N+1 that is couple to the trigger input of gate 712-N+2 may cause the output of gate 712-N+2 to go high and select the second scan line. At the same time, a low level on trigger signal bus 715 may cause the output of gate 712-N+1 to go low and deselect the first scan line. In this way, in each of N clock cycles of the second clock signal, one scan line may be selected, and thus pixels connected to the scan line may receive image data from data lines 722 for displaying image contents.

By delaying trigger signal TRIG_R 740-2 with respect to trigger signal TRIG_L 740-1 and delaying the second clock signal with respect to the first clock signal, for example, by a half cycle time such that the active periods of the first clock signal may not overlap with the active periods of the second clock signal. As a result, for each data line, the pixels on the left region and the pixels on the right region may be alternately selected to connect to the data line and be driven by data present on the data line, which may be rearranged accordingly such that image data for the left region may be interleaved with image data for the right region on the data line.

In some implementations, a switch 717 may be used to set the display device to a first mode for sequential image display as described above with respect to FIG. 3, or to a second mode for interleaved image display as described above with respect to FIG. 7. For example, the trigger input of gate N+1 (712-N+1) may be connected to either trigger signal bus 715 or the output of gate N (712-N) by switch 717. If the trigger input of gate N+1 (712-N+1) is connected to the output of gate N (712-N), the display device may be set to the first mode, which may be used for legacy applications or applications where a large delay between corresponding contents displayed to the left eye and right eye is tolerable, such as viewing normal image frames rather than VR image frames. If the trigger input of gate N+1 (712-N+1) is connected to the trigger signal bus 715, the display device may be set to the second mode, which may be used for applications where a small delay between corresponding contents displayed to the left eye and right eye is desired, such as viewing VR image frames. Switch 717 may be controlled by a switching signal (not shown in FIG. 7). The switching signal may be generated by a driver IC, such as DIC 220 of FIG. 2, and may be sent to display panel 700 through, for example, scan control bus 250.

Figure 8:
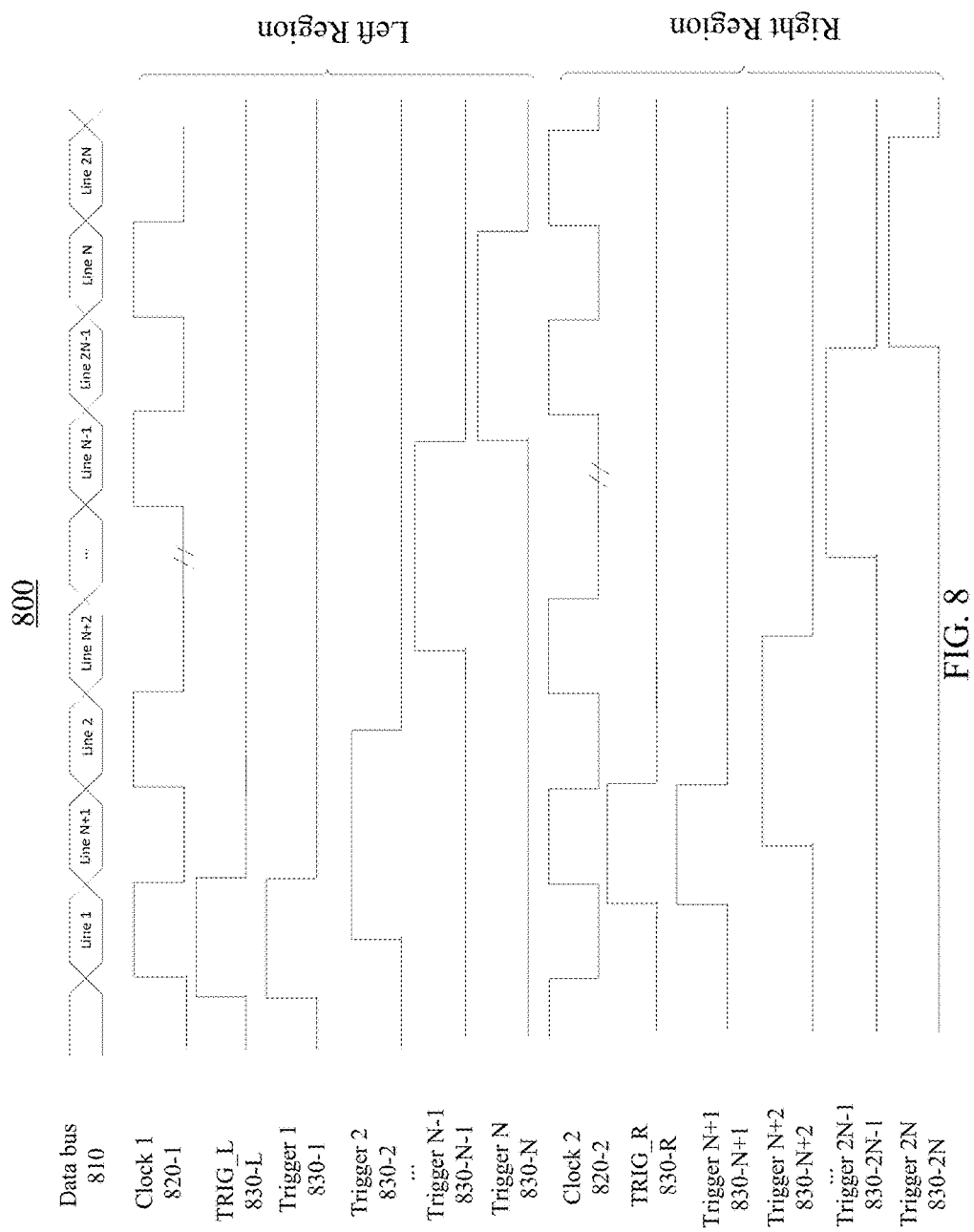
FIG. 8 is an example timing diagram illustrating example data and control signals for displaying an image frame using the display panel shown in FIG. 7, according to certain embodiments.

FIG. 8 is an example timing diagram 800 illustrating example data and control signals for displaying an image frame using the display panel shown in FIG. 7, according to certain embodiments. Timing diagram 800 shows image data on data bus 810 and control signals for GOA 710, such as the clock signals and trigger signals. As described above, the image data and the control signals may be sent to the display panel from a driver IC, such as DIC 220. Clock signals may include a Clock 1 signal 820-1 and a Clock 2 signal 820-2. Clock 1 signal 820-1 and Clock 2 signal 820-2 may have different phases such that, when one clock signal is in an active period, the other clock signal is in an inactive period.

The trigger signals may include a TRIG_L signal 830-L for the left region of the display panel and a TRIG_R signal 830-R for the right region of the display panel. TRIG_L signal 830-L may be connected to the trigger input of gate 1 (712-1) of gates 1-N as shown in FIG. 7. Thus, Trigger 1 (830-1) for gate 1 (712-1) is shown as substantially the same as TRIG_L signal 830-L. The output from gate 1 may be sent to the trigger input of gate 2 (712-2) as Trigger signal 2 (830-2), the output from gate 2 may be sent to the trigger input of gate 3 (712-3) as Trigger signal 3 (830-3), . . . , and the output from gate N−1 may be sent to the trigger input of gate N (712-N) as Trigger signal N (830-N). TRIG_R signal 830-R may be connected to the trigger input of gate N+1 (712-N+1) of gates N+1-2N as shown in FIG. 7. The output from gate N+1 may be sent to the trigger input of gate N+2 (712-N+2) as Trigger signal N+2 (830-N+2), the output from gate N+2 may be sent to the trigger input of gate N+3 (712-N+3) as Trigger signal N+3 (830-N+3), . . . , and the output from gate 2N−1 may be sent to the trigger input of gate 2N (712-2N) as Trigger signal 2N (830-2N).

At the first clock cycle of Clock 1 signal 820-1, image data for pixels connected to scan line 1 may be sent to the data lines. A positive pulse on TRIG_L signal 830-L may be sent to trigger signal bus 714 such that, when Clock 1 signal 820-1 is in an active period, for example, at an edge (rising or falling) or at a high or low level, TRIG_L signal 830-L is at a high level. As a result, a high level output may be generated by gate 1 (712-1) and sent to scan line 1 to turn on the switches of pixels connected to scan line 1, so that the display cells of pixels connected to scan line 1 may receive image data present on the data lines. The high level output from gate 1 may also be sent to the trigger input of gate 2 (712-2).

While Clock 1 signal 820-1 is in an inactive period of cycle 1 (e.g., at a low level), Clock 2 signal 820-2 may be in an active period of clock cycle 1 of Clock 2 signal 820-2. A positive pulse on TRIG_R signal 830-R may be sent to trigger signal bus 715 such that, when Clock 2 signal 820-2 is in an active period, for example, at an edge (rising or falling) or at a high or low level, TRIG_R signal 830-R is at a high level. As a result, a high level output may be generated by gate N+1 (712-N+1) and sent to scan line N+1 to turn on the switches of pixels connected to scan line N+1, so that the display cells of pixels connected to scan line N+1 may receive image data present on the data lines. The high level output from gate N+1 may also be sent to the trigger input of gate N+2 (712-N+2).

While Clock 2 signal 820-2 is in an inactive period of cycle 1 of Clock 2 signal 820-2, Clock 1 signal 820-1 may be in an active period of clock cycle 2 of Clock 1 signal 820-1. Because TRIG_L signal 830-L is at a low level and the signal at the trigger input of gate 2 (output of gate 1) is at a high level in the active period, the output of gate 1 may be toggled to a low level, and the output of gate 2 may be toggled to a high level. As such, scan line 1 may be deselected to disconnect the display cells of pixels connected to scan line 1 from the data lines, and scan line 2 driven by the output of gate 2 may be selected to connect display cells of pixels connected to scan line 2 to the data lines. Therefore, image data for pixels connected to scan line 2 may be received by the display cells of pixels connected to scan line 2 from the data lines.

While Clock 1 signal 820-1 is in an inactive period of cycle 2 (e.g., at a low level), clock 2 signal 820-2 may be in an active period of clock cycle 2 of Clock 2 signal 820-2. Because the signal level on TRIG_R signal 830-R is low and the signal level at the trigger input of gate N+2 (output of gate N+1) is high in the active period, the output of gate N+1 may be toggled to a low level, while the output of gate N+2 may be toggled to a high level. As such, scan line N+1 may be deselected to disconnect the display cells of pixels connected to scan line N+1 from the data lines. Scan line N+2 driven by the output of gate N+2 may be selected to connect display cells of pixels connected to scan line N+2 to the data lines. Therefore, image data for pixels connected to scan line N+2 may be received by the display cells of pixels connected to scan line N+2 from the data lines.

In this way, the scan lines in the left region and the scan lines in the right region may be selected alternately to connect the display cells of pixels connected to each scan line to the data lines for receiving image data. After cycle N of Clock 1 signal 820-1 and cycle N of Clock 2 signal 820-2, image data for an image frame may have been sent to the corresponding pixels.

Figure 9:
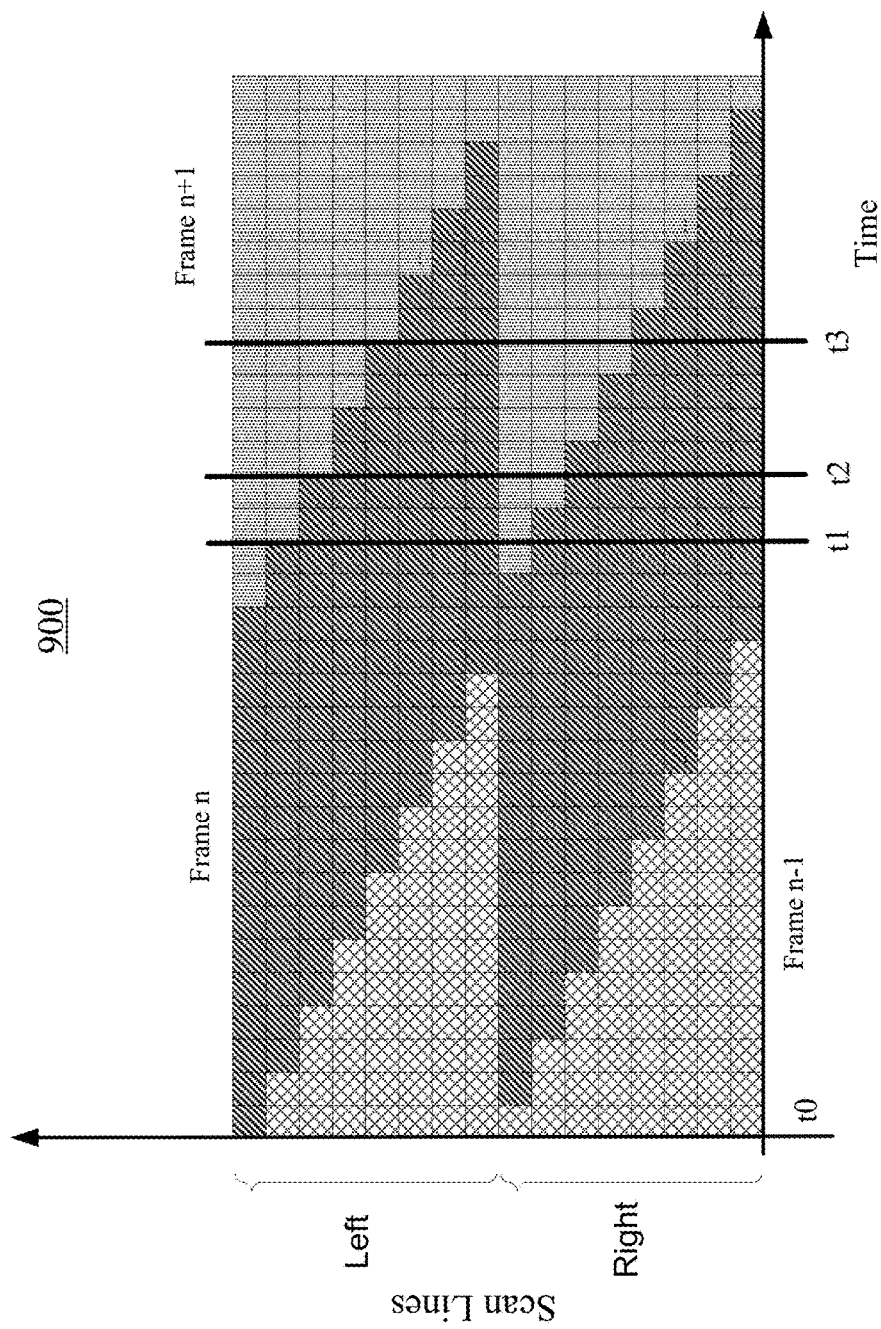
FIG. 9 is an example chart illustrating scanning of lines of pixels of a single-panel display for consecutive image frames, according to certain embodiments.

FIG. 9 is an example chart 900 illustrating the scanning of lines of pixels of a single-panel display for consecutive image frames, according to certain embodiments. The x-axis of chart 900 represents the time instants (e.g., clock cycle) during the image frame scanning, and the y-axis of chart 900 represents the image content displayed by pixels connected to each scan line of the single-panel display that includes a left region (including N scan lines) and a right region (including N scan lines). At time t0, pixels connected to each scan line of the single-panel display may display image content for image frame n−1. In each of subsequent 2N clock cycles, pixels connected to one scan line may be selected to receive image data for image frame n. The scan lines may be selected alternately from the left region and the right region. For example, a first set of one or more lines of pixels in the left region may be selected to receive image data for image frame n, and then a first set of one or more lines of pixels in the right region may be selected to receive corresponding image data for the same image frame n. Subsequently, a second set of one or more lines of pixels in the left region may be selected to receive image data for image frame n, and then a second set of one or more lines of pixels in the right region may be selected to receive corresponding image data for the same image frame n. After 2N clock cycles, pixels connected to each scan line of the single-panel display may have received the image data for image frame n, and the single-panel display may display image content for image frame n to both eyes of a user. In each of next 2N clock cycles, pixels connected to one scan line may be selected to receive image data for image frame n+1. The scan lines may be selected alternately from the left region and the right region. After 2N clock cycles, pixels connected to each scan line of the single-panel display may have received the image data for image frame n+1, and thus the single-panel display may display image contents for image frame n+1 to both eyes of the user.

Even through FIG. 9 shows that, in some implementations, one line of pixels in the left region may be selected, and then one line of pixels in the right region may be selected before another line of pixels in the left region is selected, in some other implementations, two or more lines of pixels in the left region may be selected sequentially to receive image data for display, and then two or more lines of pixels in the right region may be selected sequentially to receive image data for display before another line of pixels in the left region is selected.

Figure 10:
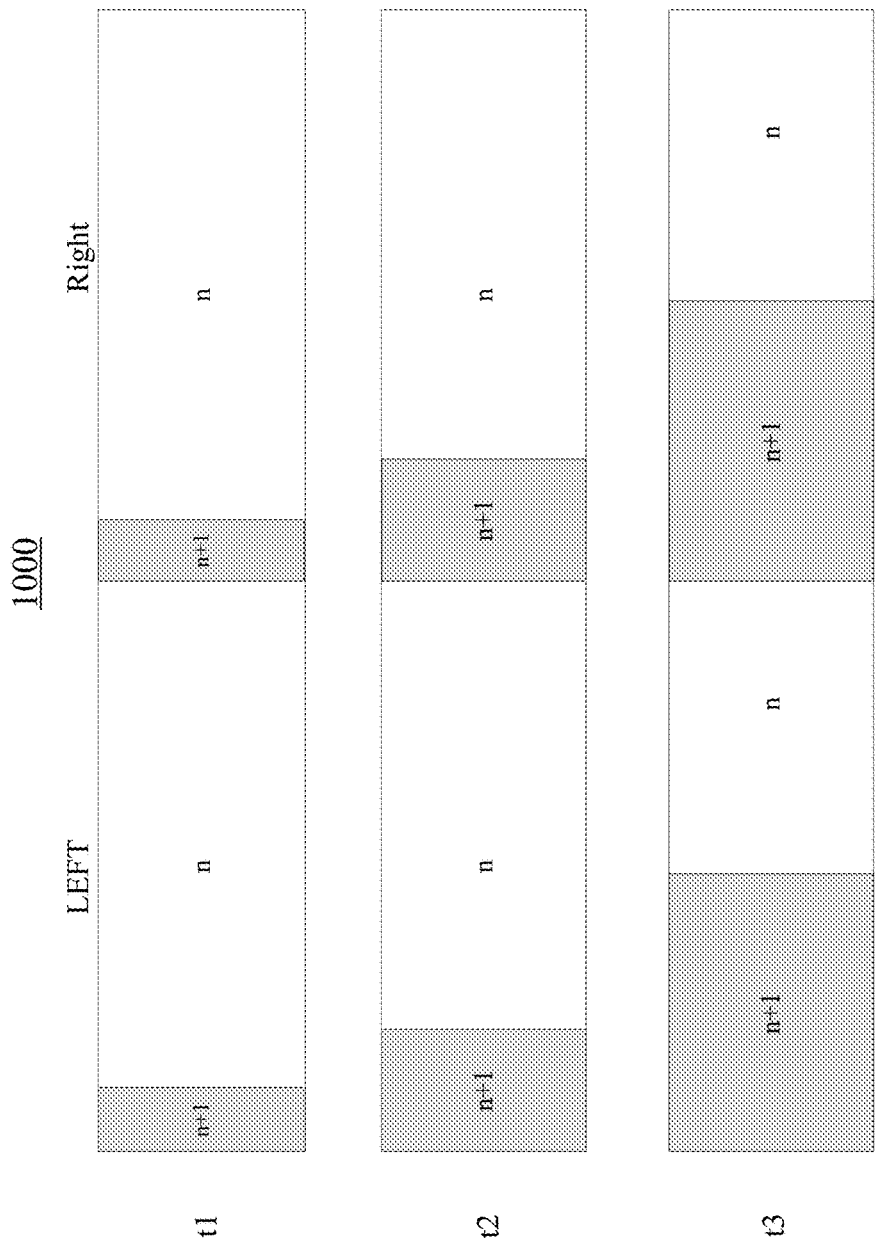
FIG. 10 illustrates example displayed contents at different time instants during the scanning of lines of pixels of a single-panel display.

FIG. 10 illustrates example displayed contents at different time instants shown in FIG. 9 during the scanning of lines of pixels of a single-panel display. After time t1, a first set of one or more lines of pixels in the left region and a first set of one or more lines of pixels in the right region may have received corresponding image data for image frame n+1, while other portions of the pixels in the left region and the right region may still display image contents for image frame n. After time t2, the first set and a second set of one or more lines of pixels in the left region and the first set and a second set of one or more lines of pixels in the right region may have received corresponding image data for image frame n+1, while other portions of the pixels in the left region and the right region may still be displaying image contents for image frame n. After time t3, about a half of the pixels in the left region and a half of the pixels in the right region may have received corresponding image data for image frame n+1, while about a half of the pixels in the left region and a half of the pixels in the right region may still display image contents for image frame n. Thus, at any given time, the left region and the right region of the single display panel may display substantially synchronized corresponding image contents for an image frame to the left and right eyes of a user. Thus, a delay between the time when certain image content for an image frame is displayed to the left region and the time when the corresponding image content is displayed to the right region of the single display panel may be minimized. For example, the delay may be about one half of a clock cycle, rather than about one half of a frame period as shown in FIG. 6.

In some video image display devices (e.g., an LCD display device), because the LCD does not produce light by itself (unlike, for example, cathode ray tube (CRT) displays or LED displays), a backlight unit (BLU) may be used to illuminate the LCD display device from the side or back of the display panel to produce a visible image. For example, in some display devices, LEDs may be used as the BLU to illuminate the display device. The BLU may include a number of individual backlights each configured to illuminate a segment of the display panel having a shape of, for example, a rectangle, a circle, a polygon, or the like. In such display devices, BLU control signals may be set accordingly to illuminate at least a segment of the left region and/or at least a segment of the right region of the LCD display panel at a time.

Figure 11:
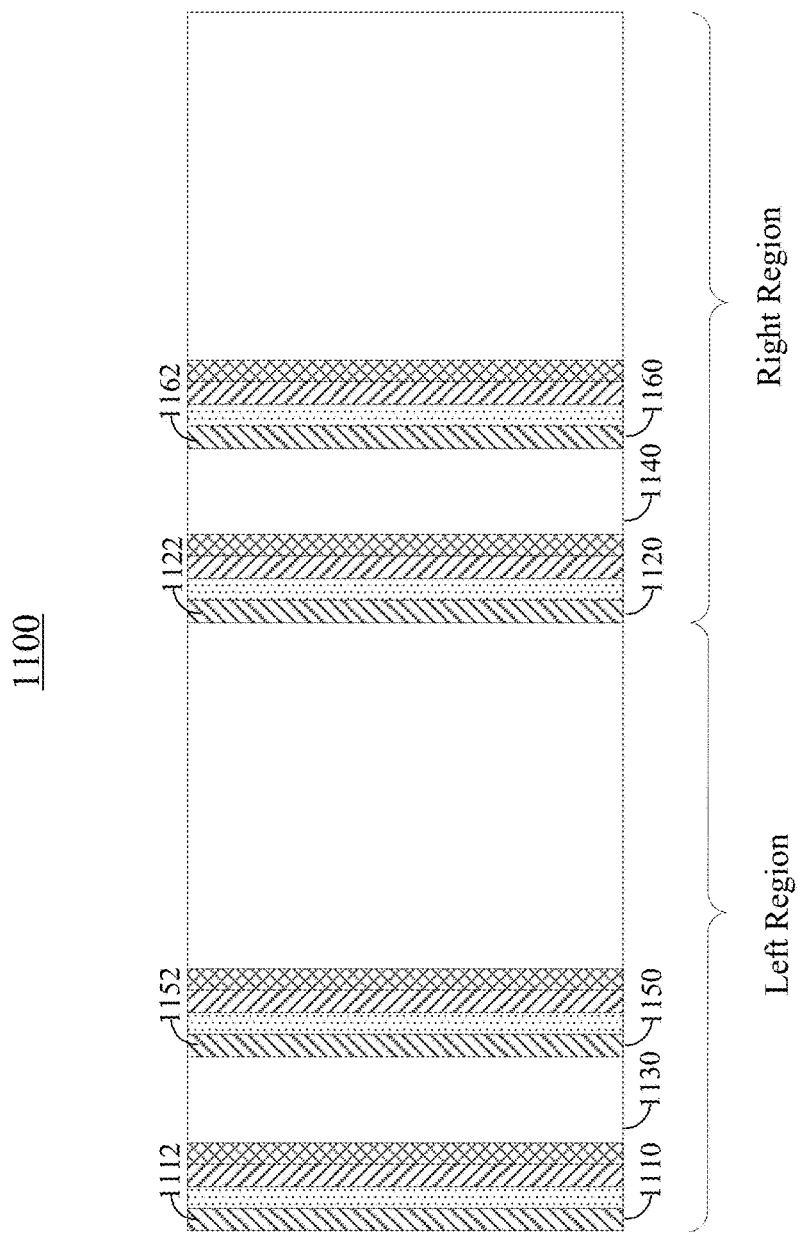
FIG. 11 illustrates example displayed contents during the scanning of lines of pixels of a single-panel display module including a backlight unit (BLU), according to certain embodiments.

FIG. 11 illustrates example display contents during the scanning of lines of pixels of a single-panel display module 1100 with a backlight unit (BLU), according to certain embodiments. Single-panel display module 1100 may include a left region and a right region. Each of the left region and the right region may include a plurality of segments, such as segments 1110, 1120, 1130, 1140, 1150, 1160, etc. shown in FIG. 11. Each segment may include one or more lines of pixels and may be illuminated by a backlight. For example, segments 1110, 1130, and 1150 in the left region may each include one or more lines of pixels (e.g., line of pixels 1112 or 1152) and may each be illuminated by a different backlight. Similarly, segments 1120, 1140, and 1160 in the right region may each include one or more lines of pixels (e.g., line of pixels 1122 or 1162), and may each be illuminated by a different backlight.

As described above with respect to FIGS. 7-10, during the scanning of an image frame, the lines of pixels in the left region and the lines of pixels in the right region of the display panel may be alternately selected to receive image data for display. Thus, lines of pixels 1112 in segment 1110 in the left region and lines of pixels 1122 in segment 1120 in the right region may be selected alternately to receive image data for display. After lines of pixels 1112 in segment 1110 in the left region have received the corresponding image data, the backlight (e.g., LED) for segment 1110 may be turned on to illuminate pixels in segment 1110. After lines of pixels 1122 in segment 1120 in the right region have received the corresponding image data, the backlight (e.g., LED) for segment 1120 may be turned on to illuminate pixels in segment 1120. Subsequently, lines of pixels in segments 1130 and 1140 may be selected alternately to receive image data, and may then be illuminated by the corresponding backlights for displaying image content to a user after the lines of pixels in segment 1130 or 1140 have received the corresponding image data. Afterwards, lines of pixels in segments 1150 and 1160 may be selected alternately to receive image data, and may then be illuminated by the corresponding backlights for displaying image content to a user after the lines of pixels in segment 1150 or 1160 have received the corresponding image data.

Figure 12:
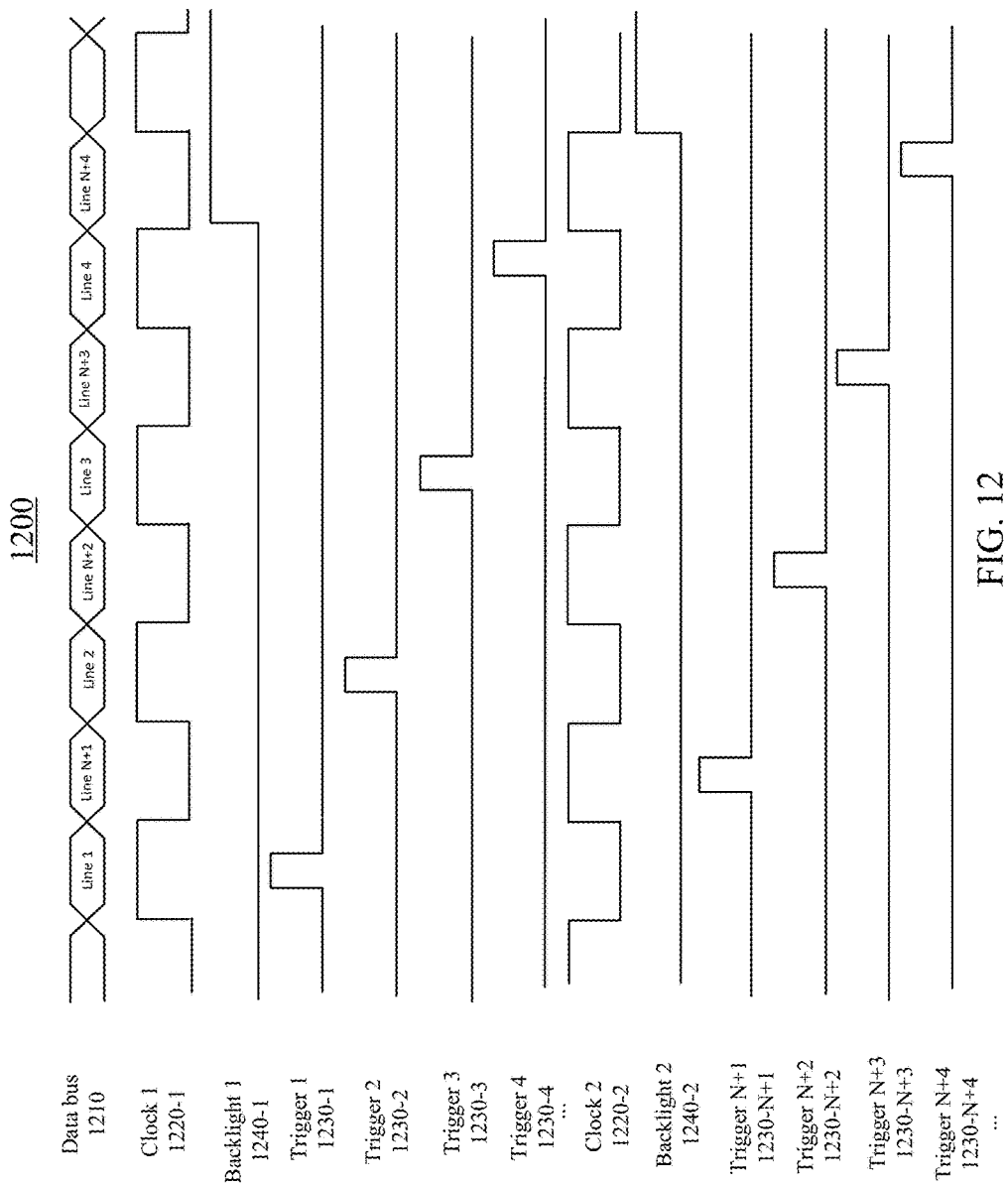
FIG. 12 is an example timing diagram illustrating example data and control signals for displaying an image frame in a single-panel display module including a BLU, according to certain embodiments.

FIG. 12 is an example timing diagram 1200 illustrating example data and control signals for displaying an image frame in a single-panel display module including a BLU, according to certain embodiments. Timing diagram 1200 shows scrambled image data on data bus 1210 and control signals for GOA 710 on control signal bus, such as clock signals and trigger signals. As described above, the image data and the control signals may be sent to the display panel from a driver IC, such as DIC 220. Clock signals may include a clock 1 signal 1220-1 and a clock 2 signal 1220-2. Clock 1 signal 1220-1 and clock 2 signal 1220-2 may have opposite phases such that, when one clock signal is in an active period, the other clock signal is in an inactive period. Scan lines in a segment of the left region of the display panel may be driven by GOA outputs to sequentially select the lines of pixels in the segment of the left region of the display panel. For example, if each segment of the display panel includes 4 lines of pixels, the GOA outputs may be determined by the levels of the trigger inputs Trigger 1 (1230-1) to Trigger 4 (1230-4) during the active periods of clock 1 (1220-1). After the four lines of pixels in the segment have received image data for display, a backlight control signal Backlight 1 (1240-1) may be used to turn on the backlight (e.g., an LED) for the segment.

As described above, the active period of the clock may include a rising/falling edge of the clock or a period when the level of the clock signal is above/below a threshold level. During some time period when clock 1 is not in the active period, clock 2 (1220-2) may be in the active period. Scan lines in a segment of the right region of the display panel may be driven by GOA outputs to sequentially selected the lines of pixels in the segment of the right region of the display panel. In an example where each segment of the display panel includes 4 lines of pixels, the GOA outputs may be determined by the levels of the trigger inputs Trigger N+1 (1230-N+1) to Trigger N+4 (1230-N+4) during the active periods of clock 2 (1220-2). After the four lines of pixels in the segment have received image data for display, a backlight control signal Backlight 2 (1240-2) may be used to turn on the backlight (e.g., an LED) for the segment.

Figure 13:
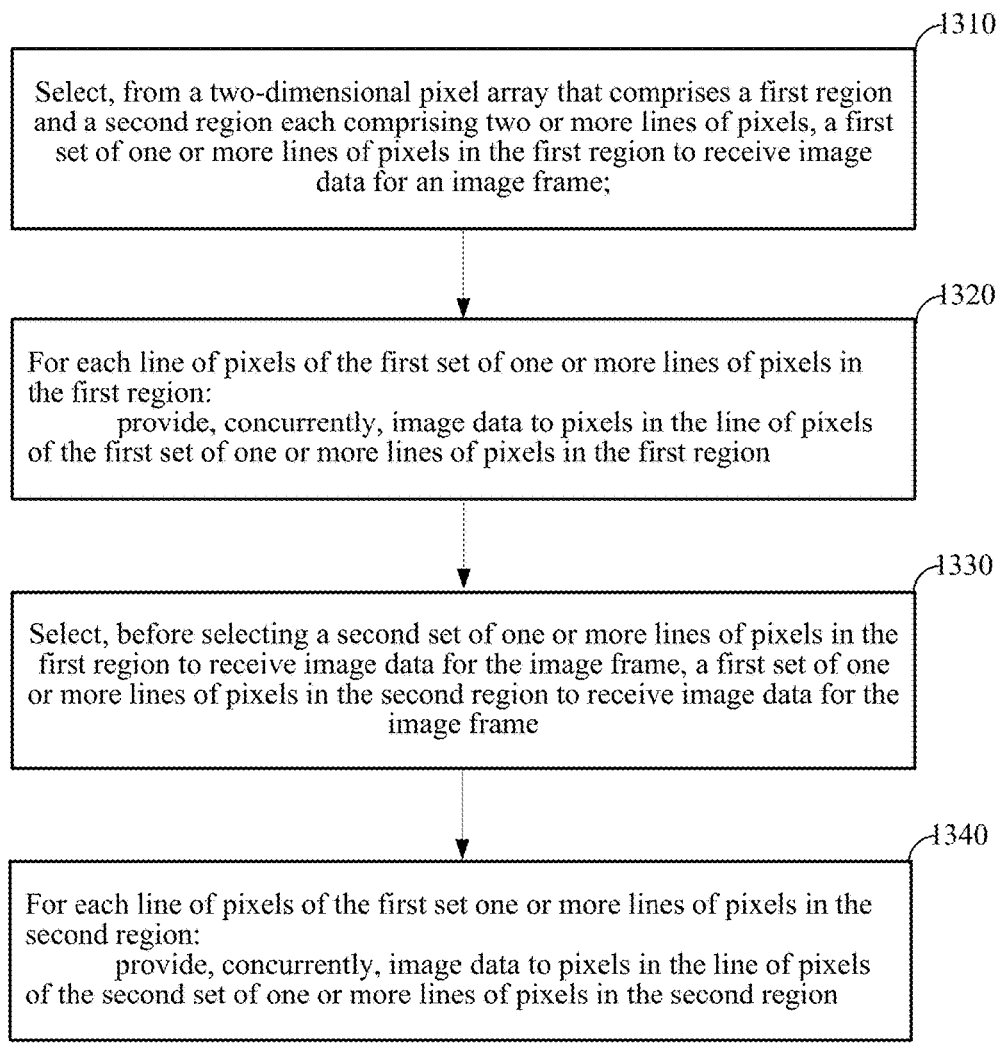
FIG. 13 is a flow chart illustrating an example method of displaying image frames on a single display panel, according to certain embodiments.

FIG. 13 is a flow chart 1300 illustrating an example method of displaying image frames on a single display panel, according to certain embodiments. The method may be performed by an image display module, such as display module 200 including a GOA as shown by GOA 710 of FIG. 7.

At block 1310, a first set of one or more lines of pixels in a first region of a two-dimensional pixel array that comprises the first region and a second region may be selected to receive image data for an image frame. Each of the first region and the second region may comprise two or more lines of pixels. The first region of the two-dimensional pixel array may be configured to display images to one eye of a user. The second region of the two-dimensional pixel array may be configured to display images to another eye of the user. In some implementations, the first set of one or more lines of pixels in the first region may include one line of pixels. In some implementations, the first set of one or more lines of pixels in the first region may include two or more lines of pixels. The first set of one or more lines of pixels in the first region may be selected by a first group of gate drivers connected to the lines of pixels as described above with respect to, for example, FIGS. 2, 7, 8, and 11. In some implementations, each gate driver may include a clock input, a trigger input, and an output coupled to a respective line of pixels in the first region or the second region. The outputs of the first group of gates may be coupled to the two or more lines of pixels in the first region. To select a line of pixels, a gate driver connected to the line of pixels may be set to output a high or low level signal. The high or low level signal may turn on a set of switches associated with the line of pixels and electrically connect display cells of the line of pixels to the data lines.

At block 1320, for each line of pixels of the first set of one or more lines of pixels in the first region, image data may be concurrently provided to pixels in the line of pixels of the first set of one or more lines of pixels in the first region. The image data may be provided by a driver IC, such as driver IC 220 of FIG. 2. As described above, the driver IC may receive data from an image processing circuit, such as SOC 230 of FIG. 2 or GPUs. In some implementations, the driver IC may include a buffer and may temporarily store image data. In some implementations, the driver IC may scramble the image data before sending the image data to the display panel.

At block 1330, before selecting a second set of one or more lines of pixels in the first region to receive image data for the image frame, a first set of one or more lines of pixels in the second region may be selected to receive image data for the image frame. The first set of one or more lines of pixels in the second region may be selected by a second group of gate drivers connected to the lines of pixels in the second region as described above with respect to, for example, FIGS. 2, 7, 8, and 11. In some implementations, each gate driver of the second group of gate drivers may include a clock input, a trigger input, and an output coupled to a respective line of pixels in the second region. The outputs of the second group of gates may be coupled to the two or more lines of pixels in the second region. To select a line of pixels, a gate driver connected to the line of pixels may be set to output a high or low level signal, where the high or low level signal may turn on a set of switches associated with the line of pixels and electrically connect display cells of the line of pixels to the data lines.

At block 1340, for each line of pixels of the first set of one or more lines of pixels in the second region, image data may be concurrently provided to pixels in the line of pixels of the first set of one or more lines of pixels in the second region. The image data may be provided by a driver IC, such as driver IC 220 of FIG. 2. As described above, the driver IC may receive data from an image processing circuit, such as SOC 230 of FIG. 2 or GPUs. Subsequently, a second set of one or more lines of pixels in the first region may be selected to receive image data for the image frame, followed by selecting a second set of one or more lines of pixels in the second region to receive image data for the image frame.

It is noted that even though FIG. 13 describes the operations as sequential processes, some of the operations may be performed in parallel or concurrently. In addition, the order of the operations may be rearranged. An operation may have additional steps not included in the figure. For example, in some implementations where backlights are used to illuminate different segments of the display panel, the method may include turning on the corresponding backlight after lines of pixels in a segment have received image data for displaying. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

As described above, various general purpose or special purpose display devices may be used to implement some of the methods or perform some of the operations disclosed herein. The display devices may be portable (e.g., a mobile phone or a laptop computer) or stationary (e.g., a general purpose desktop computer or a server). Some devices may include some or all components for performing some or all operations disclosed herein. Some devices may be combined with one or more other devices to perform some or all operations disclosed herein.

Figure 14:
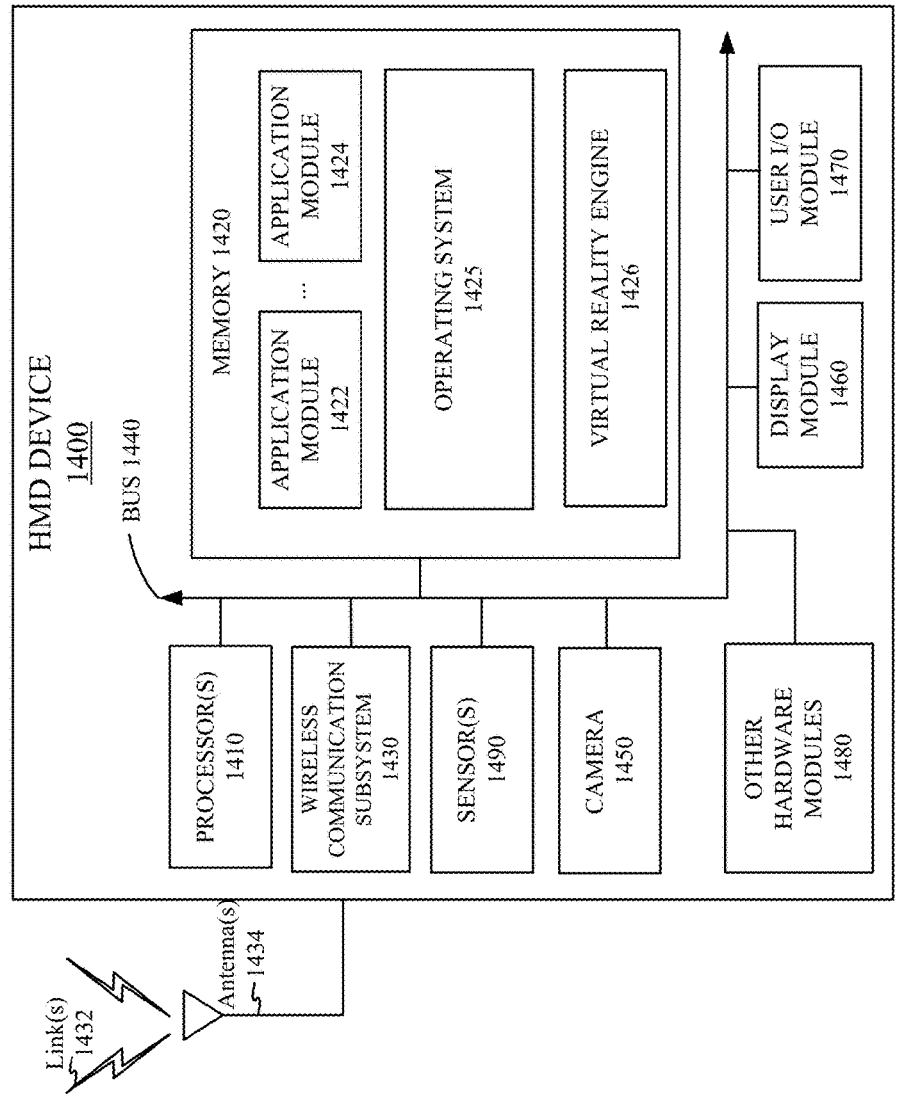
FIG. 14 is a simplified block diagram of an electronic system of an example HMD device for implementing some of the examples disclosed herein.

FIG. 14 is a simplified block diagram of an electronic system of an example HMD device 1400 for implementing some of the examples disclosed herein. HMD device 1400 may be used to implement HMD device 100. In this example, HMD device 1400 may include one or more processor(s) 1410 and a memory 1420. Processor(s) 1410 may be configured to execute instructions for performing operations at a number of components, and can be, for example, a general-purpose processor or microprocessor suitable for implementation within a portable electronic device. Processor(s) 1410 may be communicatively coupled with a plurality of components within HMD device 1400. To realize this communicative coupling, processor(s) 1410 may communicate with the other illustrated components across a bus 1440. Bus 1440 may be any subsystem adapted to transfer data within HMD device 1400. Bus 1440 may include a plurality of computer buses and additional circuitry to transfer data.

Memory 1420 may be coupled to processor(s) 1410. In some embodiments, memory 1420 may offer both short-term and long-term storage and may be divided into several units. Memory 1420 may be volatile, such as static random access memory (SRAM) and/or dynamic random access memory (DRAM) and/or non-volatile, such as read-only memory (ROM), flash memory, and the like. Furthermore, memory 1420 may include removable storage devices, such as secure digital (SD) cards. Memory 1420 may provide storage of computer-readable instructions, data structures, program modules, and other data for HMD device 1400. In some embodiments, memory 1420 may be distributed into different hardware modules. A set of instructions and/or code might be stored on memory 1420. The instructions might take the form of executable code that may be executable by HMD device 1400, and/or might take the form of source and/or installable code, which, upon compilation and/or installation on HMD device 1400 (e.g., using any of a variety of generally available compilers, installation programs, compression/decompression utilities, etc.), may take the form of executable code.

In some embodiments, memory 1420 may store a plurality of application modules 1422 through 1424, which may include any number of applications. Examples of applications may include gaming applications, conferencing applications, video playback applications, or other suitable applications. Application modules 1422-1424 may include particular instructions to be executed by processor(s) 1410. In some embodiments, certain applications or parts of application modules 1422-1424 may be executable by other hardware modules 1480. In certain embodiments, memory 1420 may additionally include secure memory, which may include additional security controls to prevent copying or other unauthorized access to secure information.

In some embodiments, memory 1420 may include an operating system 1425 loaded therein. Operating system 1425 may be operable to initiate the execution of the instructions provided by application modules 1422-1424 and/or manage other hardware modules 1480 as well as interfaces with a wireless communication subsystem 1430 which may include one or more wireless transceivers. Operating system 1425 may be adapted to perform other operations across the components of HMD device 1400 including threading, resource management, data storage control and other similar functionality.

Wireless communication subsystem 1430 may include, for example, an infrared communication device, a wireless communication device and/or chipset (such as a Bluetooth® device, an 1402.11 device, a Wi-Fi device, a WiMax device, cellular communication facilities, etc.), and/or similar communication interfaces. HMD device 1400 may include one or more antennas 1434 for wireless communication as part of wireless communication subsystem 1430 or as a separate component coupled to any portion of the system. Depending on desired functionality, wireless communication subsystem 1430 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1430 may permit data to be exchanged with a network, other computer systems, and/or any other devices described herein. Wireless communication subsystem 1430 may include a means for transmitting or receiving data, such as identifiers of HMD devices, position data, a geographic map, a heat map, photos, or videos, using antenna(s) 1434 and wireless link(s) 1432. Wireless communication subsystem 1430, processor(s) 1410, and memory 1420 may together comprise at least a part of one or more of a means for performing some functions disclosed herein.

Embodiments of HMD device 1400 may also include one or more sensors 1490. Sensor(s) 1490 may include, for example, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input. For example, in some implementations, sensor(s) 1490 may include one or more inertial measurement units (IMUs) and/or one or more position sensors. An IMU may generate calibration data indicating an estimated position of HMD device 1400 relative to an initial position of HMD device 1400, based on measurement signals received from one or more of the position sensors. A position sensor may generate one or more measurement signals in response to motion of HMD device 1400. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof.

HMD device 1400 may include a single-panel display module 1460. Display module 1460 may be a near-eye display, and may graphically present information, such as images, videos, and various instructions, from HMD device 1400 to a user. Such information may be derived from one or more application modules 1422-1424, virtual reality engine 1426, one or more other hardware modules 1480, a combination thereof, or any other suitable means for resolving graphical content for the user (e.g., by operating system 1425). Display module 1460 may use liquid crystal display (LCD) technology, light-emitting diode (LED) technology (including, for example, OLED, ILED, mLED, AMOLED, TOLED, etc.), light emitting polymer display (LPD) technology, or some other display technology.

HMD device 1400 may include a user input/output module 1470. User input/output module 1470 may allow a user to send action requests to HMD device 1400. An action request may be a request to perform a particular action. For example, an action request may be to start or end an application or to perform a particular action within the application. User input/output module 1470 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to HMD device 1400. In some embodiments, user input/output module 1470 may provide haptic feedback to the user in accordance with instructions received from HMD device 1400. For example, the haptic feedback may be provided when an action request is received or has been performed.

HMD device 1400 may include a camera 1450 that may be used to take photos or videos of a user, for example, for tracking the user's eye position. Camera 1450 may also be used to take photos or videos of the environment, for example, for VR, AR, or MR applications. Camera 1450 may include, for example, a complementary metal-oxide-semiconductor (CMOS) image sensor with a few millions or tens of millions of pixels. In some implementations, camera 1450 may include two or more cameras that may be used to capture 3-D images.

In some embodiments, HMD device 1400 may include a plurality of other hardware modules 1480. Each of other hardware modules 1480 may be a physical module within HMD device 1400. While each of other hardware modules 1480 may be permanently configured as a structure, some of other hardware modules 1480 may be temporarily configured to perform specific functions or temporarily activated. Examples of other hardware modules 1480 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1480 may be implemented in software.

In some embodiments, memory 1420 of HMD device 1400 may also store a virtual reality engine 1426. Virtual reality engine 1426 may execute applications within HMD device 1400 and receive position information, acceleration information, velocity information, predicted future positions, or some combination thereof of HMD device 1400 from the various sensors. In some embodiments, the information received by virtual reality engine 1426 may be used for producing a signal (e.g., display instructions) to display module 1460. For example, if the received information indicates that the user has looked to the left, virtual reality engine 1426 may generate content for HMD device 1400 that mirrors the user's movement in a virtual environment. Additionally, virtual reality engine 1426 may perform an action within an application in response to an action request received from user input/output module 1470 and provide feedback to the user. The provided feedback may be visual, audible, or haptic feedback. In some implementations, processor(s) 1410 may include one or more GPUs that may execute virtual reality engine 1426.

In various implementations, the above-described hardware and modules may be implemented on a single device or on multiple devices that can communicate with one another using wired or wireless connections. For example, in some implementations, some components or modules, such as GPUs, virtual reality engine 1426, and applications (e.g., tracking application), may be implemented on a console separate from the head-mounted display device. In some implementations, one console may be connected to or support more than one HMD.

In alternative configurations, different and/or additional components may be included in HMD device 1400. Similarly, functionality of one or more of the components can be distributed among the components in a manner different from the manner described above. For example, in some embodiments, HMD device 1400 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A display device comprising:
   a two-dimensional pixel array comprising a first region and a second region, each region including two or more lines of pixels; and
   a control circuit configured to:
      select a first one or more lines of pixels in the first region to receive image data for an image frame; and
      select, after selecting the first one or more lines of pixels in the first region and before selecting a second one or more lines of pixels in the first region to receive the image data for the image frame, a first one or more lines of pixels in the second region to receive the image data for the image frame.

2. The display device of claim 1, wherein:
   the first one or more lines of pixels in the first region consists of a single line of pixels; and
   the first one or more lines of pixels in the second region consists of a single line of pixels.

3. The display device of claim 1, wherein:
   the first region of the two-dimensional pixel array is configured to display images to one eye of a user; and
   the second region of the two-dimensional pixel array is configured to display images to another eye of the user.

4. The display device of claim 1, wherein the control circuit comprises a first group of gates and a second group of gates, wherein:
   each gate comprises:
      a clock input;
      a trigger input; and
      an output coupled to a respective line of pixels in the first region or the second region;
   the outputs of the first group of gates are coupled to the two or more lines of pixels in the first region; and
   the outputs of the second group of gates are coupled to the two or more lines of pixels in the second region.

5. The display device of claim 4, wherein:
   the clock inputs of the first group of gates are coupled to a first clock line; and
   the clock inputs of the second group of gates are coupled to a second clock line.

6. The display device of claim 4, wherein:
   in the first group of gates,
      the trigger input of a first gate in the first group of gates is coupled to a first trigger line for receiving a first trigger signal; and
      the output of each gate other than a last gate in the first group of gates is coupled to the trigger input of a next gate in the first group of gates; and
   in the second group of gates,
      the trigger input of a first gate in the second group of gates is coupled to a second trigger line for receiving a second trigger signal; and
      the output of each gate other than a last gate in the second group of gates is coupled to the trigger input of a next gate in the second group of gates.

7. The display device of claim 6, wherein:
   the first trigger signal includes a first pulse;
   the second trigger signal includes a second pulse; and
   the second pulse is later than the first pulse.

8. The display device of claim 6, wherein:
   the trigger input of the first gate in the second group of gates is coupled to the second trigger line through a switch, the switch configured to selectively couple the trigger input of the first gate in the second group of gates to the second trigger line or to the output of the last gate in the first group of gates.

9. The display device of claim 6, further comprising a driver circuit configured to provide:
   the first trigger signal;
   the second trigger signal; and
   one or more clock signals for driving the clock inputs of the first group of gates and the clock inputs of the second group of gates.

10. The display device of claim 9, wherein the driver circuit is further configured to concurrently provide the image data to pixels in a line of pixels of the first one or more lines of pixels in the first region.

11. The display device of claim 10, wherein the driver circuit is further configured to provide scrambled image data for an image frame to the two-dimensional pixel array.

12. The display device of claim 9, wherein the driver circuit is further configured to provide a backlight control signal for the two-dimensional pixel array.

13. A control circuit for a two-dimensional pixel array, the control circuit comprising:
   a first group of gates; and
   a second group of gates,
   wherein the two-dimensional pixel array comprises a first region and a second region, each region including two or more lines of pixels; and
   wherein the control circuit is configured to:
      select, using the first group of gates, a first one or more lines of pixels in the first region to receive image data for an image frame; and
      select, using the second group of gates, a first one or more lines of pixels in the second region to receive the image data for the image frame, after selecting the first one or more lines of pixels in the first region and before selecting a second one or more lines of pixels in the first region using the first group of gates to receive the image data for the image frame.

14. The control circuit of claim 13, wherein each gate in the first group of gates and the second group of gates comprises:
   a clock input;
   a trigger input; and
   an output coupled to a respective line of pixels in the first region or the second region.

15. The control circuit of claim 14, wherein:
   in the first group of gates,
      the trigger input of a first gate in the first group of gates is coupled to a first trigger line for receiving a first trigger signal; and
      the output of each gate other than a last gate in the first group of gates is coupled to the trigger input of a next gate in the first group of gates; and in the second group of gates,
the trigger input of a first gate in the second group of gates is coupled to a second trigger line for receiving a second trigger signal; and
the output of each gate other than a last gate in the second group of gates is coupled to the trigger input of a next gate in the second group of gates.

16. The control circuit of claim 15, wherein:
the trigger input of the first gate in the second group of gates is coupled to the second trigger line through a switch; and
the switch is configured to selectively couple the trigger input of the first gate in the second group of gates to the second trigger line or the output of the last gate in the first group of gates.

17. A method for single-panel image display, the method comprising:
selecting, from a two-dimensional pixel array that comprises a first region and a second region each comprising two or more lines of pixels, a first one or more lines of pixels in the first region to receive image data for an image frame; and
selecting, after selecting the first one or more lines of pixels in the first region and before selecting a second one or more lines of pixels in the first region to receive the image data for the image frame, a first one or more lines of pixels in the second region to receive the image data for the image frame.

18. The method of claim 17, wherein:
selecting the first one or more lines of pixels in the first region includes selecting two or more lines of pixels in the first region; and
selecting the first one or more lines of pixels in the second region includes selecting two or more lines of pixels in the second region.

19. The method of claim 17, wherein:
selecting the first one or more lines of pixels in the first region includes selecting the first one or more lines of pixels in the first region using a first trigger signal; and
selecting the first one or more lines of pixels in the second region includes selecting the first one or more lines of pixels in the second region using a second trigger signal, wherein a phase of the second trigger signal is different from a phase of the first trigger signal.

20. The method of claim 17, further comprising:
providing, concurrently, the image data to pixels in a line of pixels of the first one or more lines of pixels in the first region.

* * * * *